(12) United States Patent
Walser et al.

(10) Patent No.: US 12,134,999 B2
(45) Date of Patent: Nov. 5, 2024

(54) HIGHLY ACCURATE CONTINUOUS-FLOW VAPORIZED FUEL SUPPLY FOR LARGE DYNAMIC POWER RANGES

(71) Applicant: EControls, LLC, Antonio, TX (US)

(72) Inventors: Michael W. Walser, Comfort, TX (US); Randall W. Walser, Canadian, TX (US); Christopher M. Cole, Spring Branch, TX (US); Justin H. Sanders, San Antonio, TX (US); Joseph Grogan, San Antonio, TX (US); Kenneth Shouse, Fair Oaks Ranch, TX (US); Kennon Guglielmo, San Antonio, TX (US)

(73) Assignee: EControls, LLC, San Antonio, TX (US)

( * ) Notice: Subject to any disclaimer, the term of this patent is extended or adjusted under 35 U.S.C. 154(b) by 0 days.

(21) Appl. No.: 18/461,118

(22) Filed: Sep. 5, 2023

(65) Prior Publication Data

US 2024/0044305 A1    Feb. 8, 2024

Related U.S. Application Data

(63) Continuation of application No. 17/384,896, filed on Jul. 26, 2021, now Pat. No. 11,781,508, which is a continuation of application No. 16/435,769, filed on Jun. 10, 2019, now Pat. No. 11,105,299, which is a continuation of application No. 15/685,668, filed on (Continued)

(51) Int. Cl.
*F02M 21/02* (2006.01)
*F02D 41/00* (2006.01)
*F02D 41/30* (2006.01)

(52) U.S. Cl.
CPC ..... *F02M 21/0233* (2013.01); *F02D 41/0027* (2013.01); *F02D 41/3011* (2013.01); *F02M 21/0239* (2013.01); *Y02T 10/30* (2013.01)

(58) Field of Classification Search
CPC ............ F02M 21/0233; F02M 21/0239; F02D 41/0027; F02D 41/3011; Y02T 10/30
See application file for complete search history.

(56) References Cited

U.S. PATENT DOCUMENTS 2,475,086 A * 7/1949 Ensign ............... F02M 21/00 137/340
5,025,758 A * 6/1991 Djurdjevic ............ F02B 43/00 123/527

(Continued)

*Primary Examiner* — Sizo B Vilakazi
(74) *Attorney, Agent, or Firm* — William H. Quirk; Rosenthal Pauerstein Sandoloski Agather, LLP

(57) ABSTRACT

Methods and systems for accurate and precise fuel supply control for continuous-flow of gaseous fuel to an internal combustion engine over a large dynamic power range, including a dual-stage valve that allows optimal control—a first stage in the form of a voice-coil driven electronic pressure regulator, and a second stage in the form of a voice-coil-driven choked-flow valve; monitoring the pressure of the fuel intermediate the two stages and making appropriate adjustments to the first stage via a pressure actuator loop; feeding the gaseous fuel mixture through a unitary block assembly into the second stage; monitoring the pressure of the air/fuel mixture and making appropriate adjustments to the second stage via a valve actuator control loop.

20 Claims, 11 Drawing Sheets

Related U.S. Application Data

Aug. 24, 2017, now Pat. No. 10,316,797, which is a continuation of application No. 13/918,882, filed on Jun. 14, 2013, now Pat. No. 9,957,920.

(60) Provisional application No. 61/808,910, filed on Apr. 5, 2013, provisional application No. 61/661,775, filed on Jun. 19, 2012.

(56) References Cited

U.S. PATENT DOCUMENTS

| | | | | |
|---|---|---|---|---|
| 5,755,254 | A * | 5/1998 | Carter | G05D 16/0655 |
| | | | | 137/340 |
| 5,860,407 | A * | 1/1999 | Chapin | F02M 21/0284 |
| | | | | 123/527 |
| 5,868,159 | A * | 2/1999 | Loan | G05D 7/0635 |
| | | | | 137/486 |
| 9,528,472 | B2 * | 12/2016 | Pursifull | F02M 21/0215 |
| 2018/0223774 | A1 * | 8/2018 | Walser | F02D 41/0027 |
| 2019/0293027 | A1 * | 9/2019 | Walser | F02D 41/0027 |
| 2022/0099049 | A1 * | 3/2022 | Walser | F02M 21/0239 |

* cited by examiner

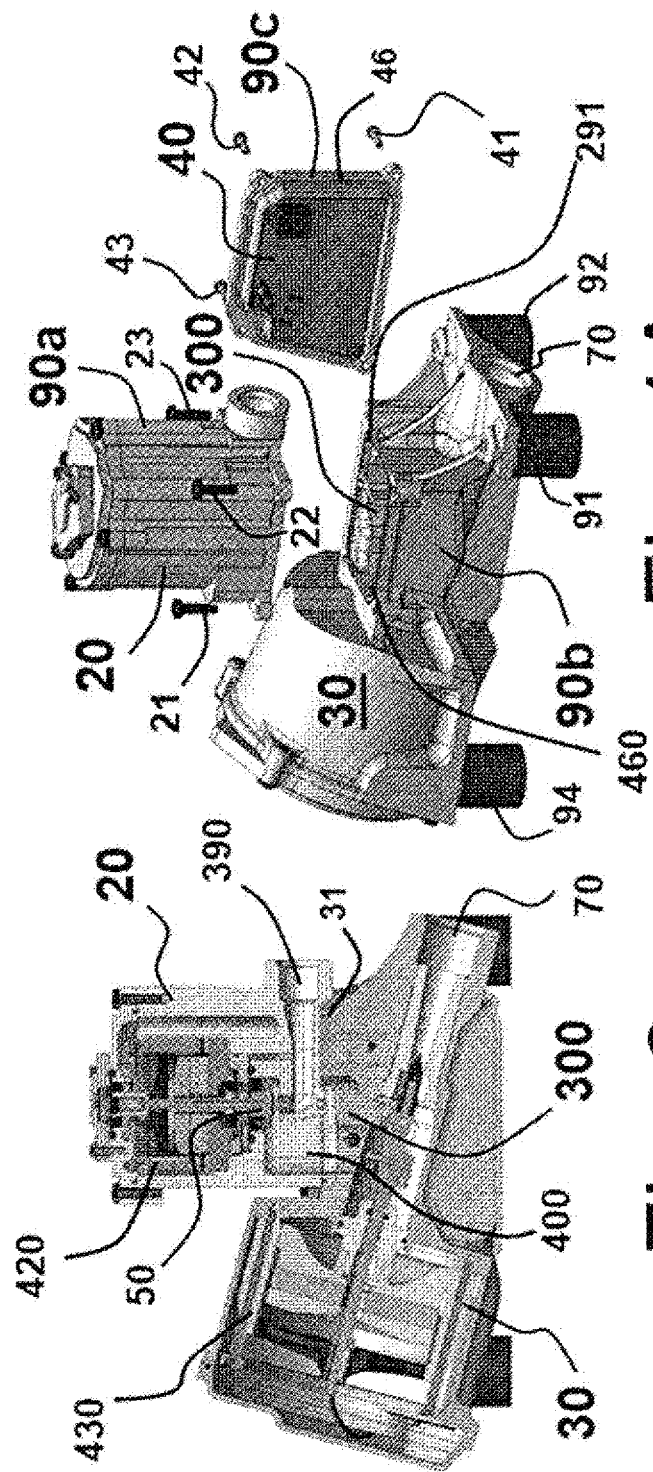

1st Stage Strategy

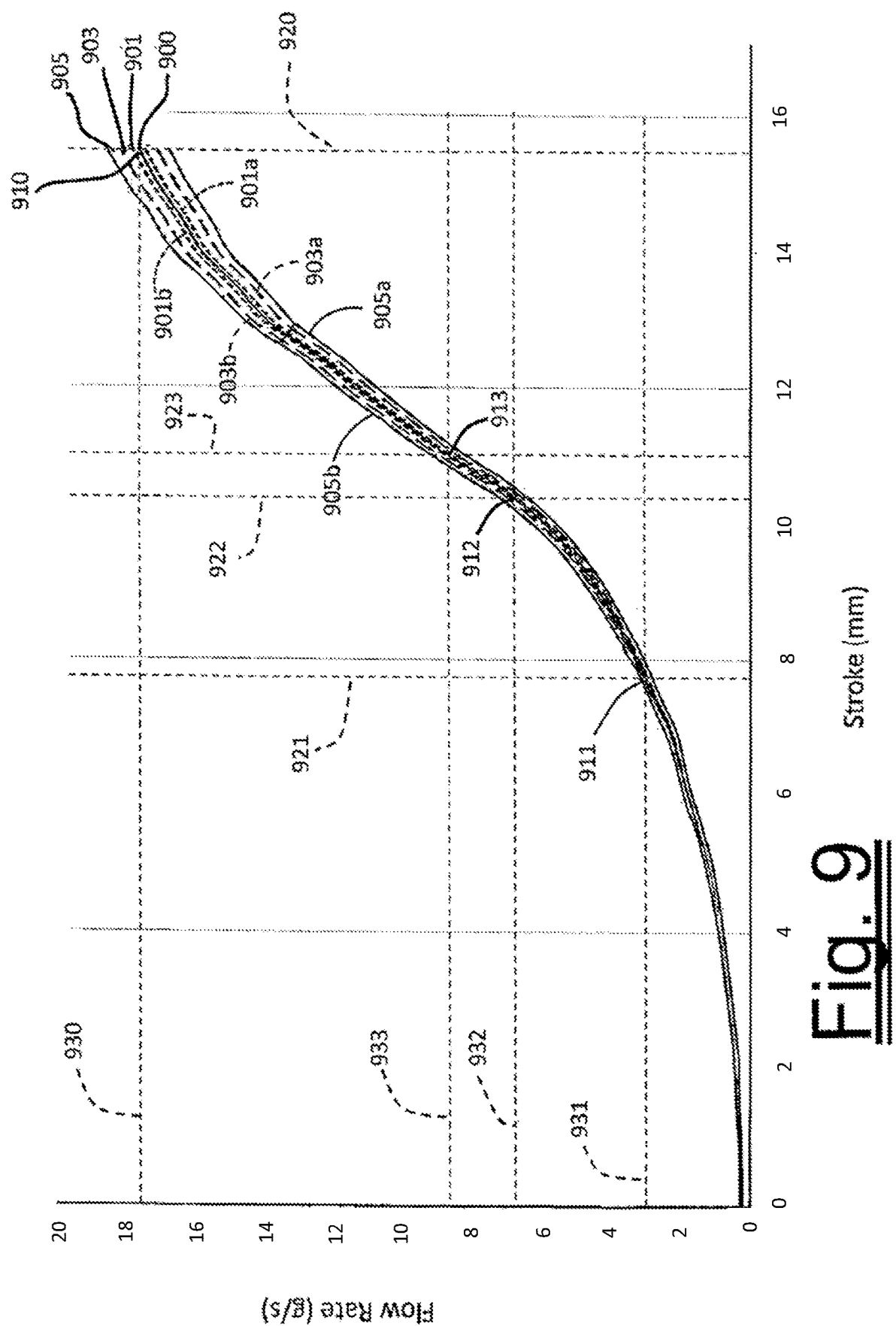

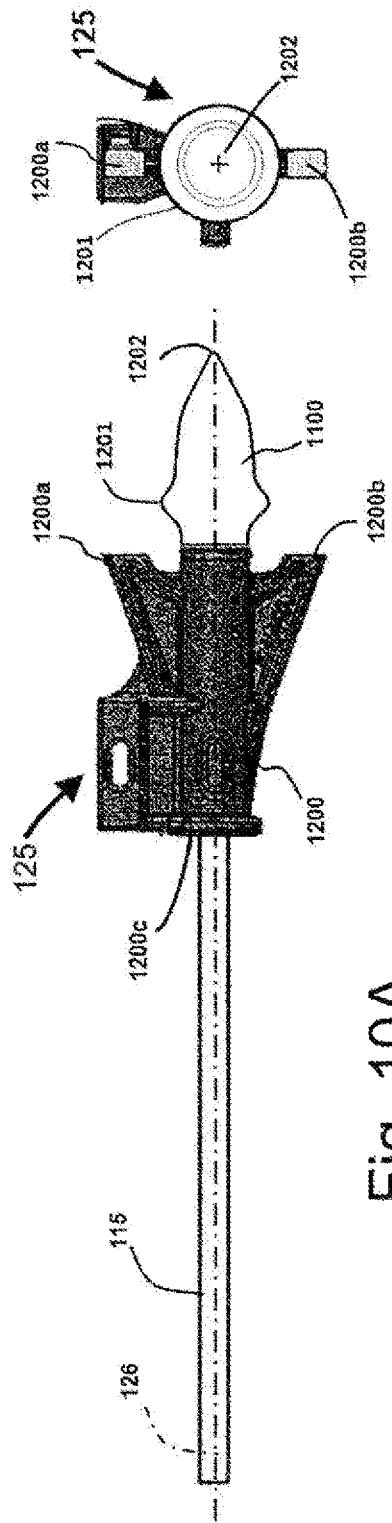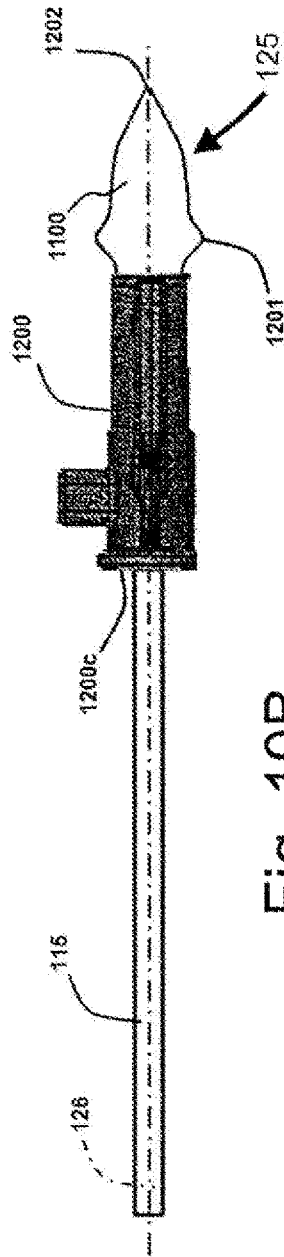
Fig. 10A
Fig. 10B
Fig. 10C

HIGHLY ACCURATE CONTINUOUS-FLOW VAPORIZED FUEL SUPPLY FOR LARGE DYNAMIC POWER RANGES

CLAIM OF PRIORITY TO PRIOR APPLICATIONS

This application is a continuation of prior-filed co-pending U.S. Non-Provisional application Ser. No. 17/384,896, filed on Jul. 26, 2021, entitled Highly Accurate Continuous-Flow Vaporized Fuel Supply for Large Dynamic Power Ranges," which is a continuation of U.S. Non-Provisional application Ser. No. 16/435,769, filed on Jun. 10, 2019, entitled "Highly Accurate Continuous-Flow Vaporized Fuel Supply for Large Dynamic Power Ranges," which issued as U.S. Pat. No. 11,105,299 on Aug. 31, 2021, which is a continuation of U.S. Non-Provisional application Ser. No. 15/685,668, filed on Aug. 24, 2017, entitled "Highly Accurate Continuous-Flow Vaporized Fuel Supply for Large Dynamic Power Ranges," which issued as U.S. Pat. No. 10,316,797 on Jun. 11, 2019, which is a continuation of U.S. Non-Provisional application Ser. No. 13/918,882, filed on Jun. 14, 2013, entitled "Highly Accurate Continuous-Flow Vaporized Fuel Supply for Large Dynamic Power Ranges," which issued as U.S. Pat. No. 9,957,920 on May 1, 2018, which claims the benefit of the filing dates of (i) U.S. Provisional Application Ser. No. 61/808,910, filed on Apr. 5, 2013, entitled "Continuous Gaseous Fuel Supply with High Turndown Ratio," and (ii) U.S. Provisional Application Ser. No. 61/661,775 filed on Jun. 19, 2012, entitled "Continuous Gaseous Fuel Supply with High Turndown Ratio," the entire disclosures, including the claims and drawings, of each enumerated patent and application being hereby incorporated by reference into the present disclosure as if set forth in their entirety.

FIELD OF THE INVENTION

The present invention primarily relates to control valves for continuous-flow gaseous fuel supplies for spark-ignited internal combustion engines. More particularly, it pertains to continuous-flow fuel supply valves and related systems for supplying vaporized fuels at instantaneously-accurate flowrates in response to engine control module/unit (ECM) demands for spark-ignited internal combustion engines, particularly over large dynamic power ranges.

BACKGROUND

ECM advancements in the 1980s vastly improved the ability to optimize efficiency and performance and minimize emission concerns with continuous-flow spark-ignited internal combustion engines. By continuously monitoring numerous sensors and inputs, ECM's can balance the current operator commands against performance conditions to determine the most ideal fuel flowrate needed for the engine at any given instant.

Knowing the ideal flowrate and delivering it, however, are two very different things. Even though modern ECMs can know the ideal at any given instant, practical prior art fuel supplies are not able to consistently deliver it instantaneously on demand across their entire range of operation. The very best of available controls claim to provide 1% setpoint accuracy, which means they claim to deliver an actual fuel supply flowrate within about 1% of the demanded flowrate. The ability to consistently deliver a continuous-flow gaseous fuel flowrate with 1% setpoint accuracy is considered extremely accurate and would be ideal, but claims to that effect tend to only be part of the story.

With the prior art, extreme setpoint accuracies tend to only be attained within a limited range of operation, which means that claimed accuracies are generally unreliable, especially for engines having large dynamic power ranges. (An engine's "dynamic power range" is the ratio of maximum power to minimum power over which the engine will operate as specified, which is dependent largely on the effective turndown ratio of the associated fuel supply system.) For a fuel supply delivering 25 grams/second at the top end of its operating range, for instance, one percent would be a quarter-gram/second (0.25 g/s). While calibrating one of the best available valves to a quarter-gram/second error can be manageable for moderate flowrates, the same fuel supply often needs to also idle at about a quarter-gram/second at the opposite end of its operating range, such that the same quarter-gram/second error would be tremendously inaccurate for near-idle flowrates. Although accurate control is sometimes considered easier to achieve with lower flowrates, 1% setpoint accuracy at a quarter-gram/second idle flowrate would require accuracy to within ±0.0025 g/s. So, while prior art gas flow valves claim to deliver extremely accurate flowrates at specified portions of their overall operating range (often at 200 kPa), it has long been unattainable to achieve as much for both ends of the operating range and everything in between, especially for such large ranges in real-world operation.

The complex interaction of too many real-world variables frustrates the pursuit of consistently-high, full-range setpoint accuracies for continuous-flow fuel supplies. Wear and tear, leaks, lag times, glitches, clogs, noise, artifacts, and general variability all tend to happen in the real world. External temperatures and wide variability in gaseous fuel compositions further compound the challenges.

Moreover, even if perfection was achievable within a fuel supply's flowrate control valve itself, flowrate accuracies can be thwarted by upstream and downstream pressure fluctuations as well. Because gaseous fuels are compressible, downstream events related to combustion or valve and piston movements can cause pressure waves that create sizable flowrate fluctuations. Upstream pressure fluctuations can be equally problematic, especially when controlling the flowrate of vaporized liquid fuels (e.g., LNG or LPG).

The control difficulties with vaporized liquids arise largely due to the dramatic variation in tank pressures during the course of operation. When an LNG fuel tank is medium full, the supply pressure generally remains manageable enough. However, control challenges increase when the tank is full because of the lack of instantaneous vapor pressure capacity, and also when the tank is closer to empty, as the amount of liquid fuel is vaporized over time. Controlling vaporized liquid fuels is all the more challenging if vaporization is less than complete at the source. If any residual liquid phase remains after passing through the vaporizer, such as too often occurs when heat exchangers become clogged, dramatic pressure spikes can arise within the flowrate control valve or at other locations that can frustrate the most reliable of control systems.

As a result, conventional gas flow valves do not consistently achieve flowrate setpoint accuracies that are fine enough to ensure optimal power and emissions over large dynamic power ranges. Even the best of controls are generally unable to consistently achieve and continuously maintain 1% flowrate setpoint accuracies across anything more than about a 15:1 or maybe 20:1 dynamic power range. Despite claims that might imply otherwise, most existing valves for large dynamic power ranges in practice generally only have "ballpark" accuracy (i.e., between 3% and 10% setpoint accuracy) over significant portions of their specified operating range. Although they produce their specified accuracy in certain easy portions of their operating range, such accuracies are usually limited to the middle or upper half of that operating range, providing overall fuel use and emission levels that fall far short of the idealized levels otherwise expected.

Thus, there has long been a need for an affordable, continuous-flow valve that can consistently and instantaneously deliver ECM-demanded mass-flowrates with extreme accuracy across a large dynamic power range, particularly in the field of vaporized natural gas fuel systems for spark-ignited engines.

BRIEF SUMMARY OF THE INVENTION

It will become evident to those skilled in the art that thoughtful use of the invention and embodiments disclosed herein will resolve the above-referenced and many other unmet difficulties, problems, obstacles, limitations, and challenges, particularly when contemplated in light of the further descriptions below considered in the context of a comprehensive understanding of the prior art.

The present invention accomplishes as much by enabling fast-acting, highly-accurate gaseous fuel flowrate control for spark-ignited internal combustion engines. Our objectives include enabling such flow control in response to instantaneous demand signals from the engine's ECM while consistently maintaining extreme accuracy over large dynamic power ranges, despite most upstream, downstream and even midstream pressure fluctuations.

Without limitation, most expressions of the invention reference a dual-stage flow valve operable to achieve choked flow of gaseous fuel for consistently highly accurate flowrate setpoint accuracy. Other expressions of the invention integrate such a valve within a fuel supply to serve the instantaneous needs of a spark-ignited internal combustion engine operating over large dynamic power ranges. The first stage of such a valve typically includes an electronic pressure regulator (or the equivalent), the second stage includes a variable choked flow valve (or the equivalent), and those two stages are juxtaposed within a common block assembly together with an onboard microcontroller that adjusts its control based on fluid conditions sensed in an interstage chamber, space or the like that is sealed between the first stage and the second stage. For further optimization, the in-block microcontroller and related control circuitry are embodied on a single printed circuit board that includes transducers in communication with the interstage chamber between the two stages. The microcontroller inter-dependently coordinates control of both stages of the CFV, essentially without any external communication other than power and data connection to the engine's ECM.

In the primary embodiment illustrated in the drawings, the first stage has a turndown ratio of 4:1 and the second stage has a turndown ratio of 50:1, resulting in a functioning power range for the CFV fuel system of 200:1. While other less-preferred turndown ratios may be achieved within the scope of alternative embodiments (with one $1^{st}$ stage alternative at 1.5:1, and a $2^{nd}$ stage alternative at 4:1), preferred alternative embodiments achieve an overall turndown ratio of at least 50:1 while retaining highly-accurate flowrate control (and, hence, power and emission control) at both ends and throughout the range of operation—i.e., achieving actual flowrates that are consistently about 1% or less deviation from targeted flowrates.

These and other aspects of the present invention also enable numerous secondary benefits ranging from optimized efficiency and emission controls to affordability, reliability, durability, versatility, and ease of manufacture, use and maintenance.

Possible embodiments can manifest in numerous different combinations and in numerous different kinds of improved machines, internal combustion engines, gaseous fuel control systems, and the like. Other possible embodiments are manifest in methods for operating and optimizing such machines, engines, systems and the like, as well as in other types of methods. All of the various multifaceted aspects of the invention and all of the various combinations, substitutions and modifications of those aspects might each individually be contemplated as an invention if considered in the right light.

The resulting combinations of the present invention are not only more versatile and reliable, but they are also able to achieve greater accuracy despite rapidly changing conditions over a larger dynamic power range than has ever been achieved with such a simple system. The various embodiments improve on the related art, including by optimizing reliability, manufacturability, cost, efficiency, ease of use, ease of repair, ease of adaptability, and the like. Although the embodiments referenced below do not provide anything remotely near an exhaustive list, this specification describes select embodiments that are thought to achieve many of the basic elements of the invention.

In accord with many of the teachings of the present invention, a dual-stage control valve is provided in a form that is readily adaptable to the power demands of numerous applications and is readily capable of achieving extremely accurate setpoint accuracy for controlling fuel flowrates across very large dynamic power ranges in internal combustion engines. Such flowrate control valves and related fuel systems materially depart from the conventional concepts and designs of the prior art, and in so doing provide many advantages and novel features which are not anticipated, rendered obvious, suggested, or even implied by any of the prior art, either alone or in any obvious combination thereof.

To be all encompassing, many other aspects, objects, features and advantages of the present invention will be evident to those of skill in the art from a thoughtful and comprehensive review of the following descriptions and accompanying drawings in light of the prior art, all to the extent patentable. It is therefore intended that such aspects, objects, features, and advantages are also within the scope and spirit of the present invention. It should be understood, however, that the detailed description and the specific examples, while indicating preferred embodiments of the invention, are given by way of illustration only, since various expansions, changes and modifications within the spirit and scope of the invention will become apparent to those skilled in the art from this detailed description.

Indeed, the present invention will ultimately be defined relative to one or more patent claims or groups of claims that may be appended to this specification or to specifications that claim priority to this specification, as those claims may be amended, divided, refined, revamped, replaced, supplemented or the like over time. Even though the corresponding scope of the invention depends on those claims, these descriptions will occasionally make references to the "invention" or the "present invention" as a matter of convenience, as though that particular scope is already fully understood at the time of this writing. Indeed, multiple independent and distinct inventions may properly be claimed based on this specification, such that reference to the "invention" is a floating reference to whatever is defined by the ultimate form of the corresponding patent claims. Accordingly, to the extent these descriptions refer to aspects of the invention that are not separately required by the ultimate patent claims, such references should not be viewed as limiting or as describing that variation of the invention.

The invention, accordingly, is not limited in its application to the details of construction and to the arrangements of the components set forth in the following descriptions or illustrated in the drawings. Instead, the drawings are illustrative only, and changes may be made in any specifics illustrated or described, especially any referenced as "preferred." Such changes can be implemented while still being within the spirit of the invention. Also, it is to be understood that the phraseology and terminology employed herein are for the purpose of the description and should not be regarded as limiting. Other terminology and language that describes the invention and embodiments and their function will be considered as within the spirit of the invention.

The invention is capable of many other embodiments and of being practiced and carried out in numerous other ways. It should also be understood that many other alternative embodiments are not shown or referenced that would still be encompassed within the spirit of the invention, which will be limited only by the scope of claims that may be original, added, or amended in this or any other patent application that may in the future claim priority to this application.

BRIEF DESCRIPTIONS OF THE DRAWINGS

Various features and advantages of the invention will now be described with reference to the drawings of certain preferred and alternative embodiments, which are intended to illustrate and not to limit the invention, wherein like reference numbers may refer to like elements.

FIG. 3 is a sectional view of the preferred unitary block assembly 90 of the CFV 10 of FIG. 2, centrally sectioned through sectional plane 3-3 of FIG. 2.

Figure 2:
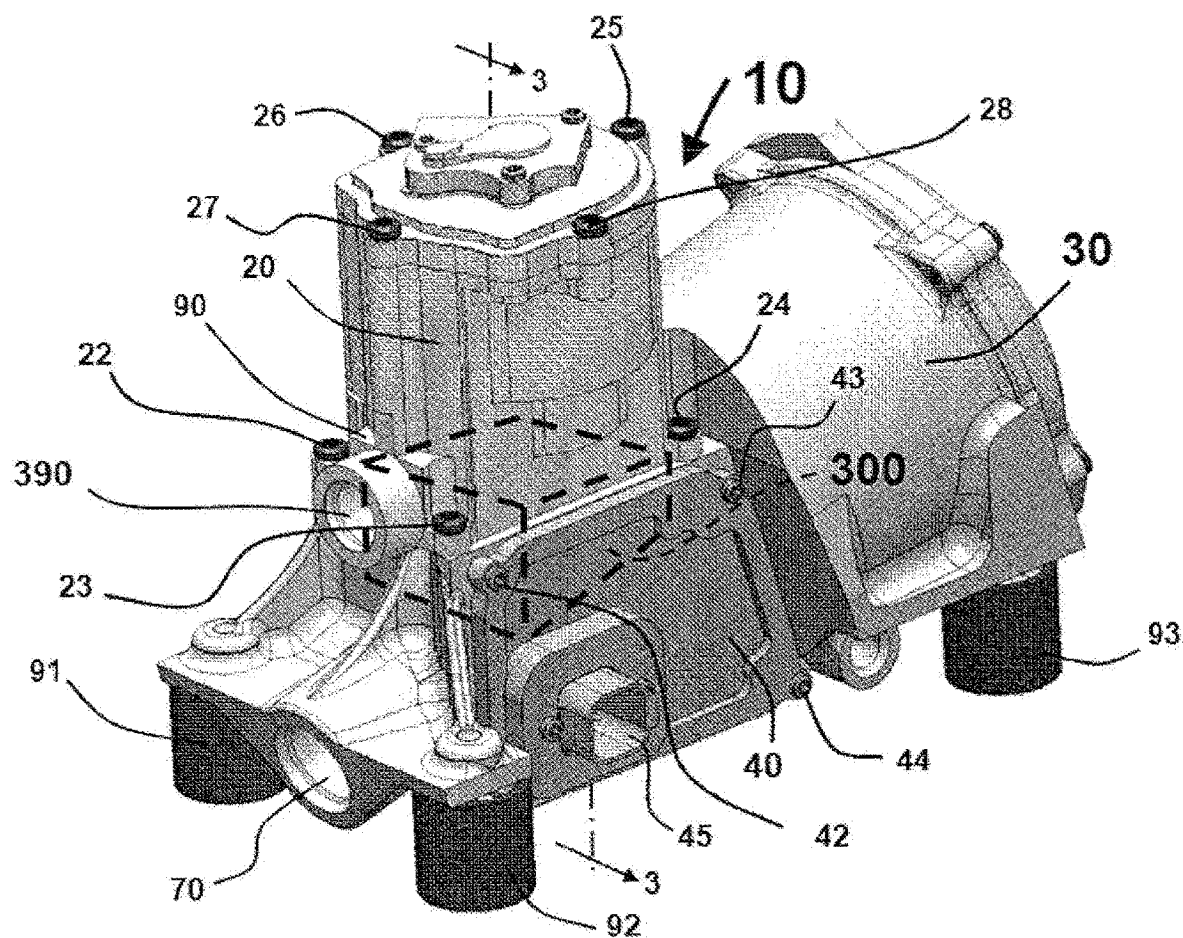
FIG. 2 is a perspective view of the preferred CFV 10 in a unitary block assembly 90.

FIG. 4A is a partially-exploded perspective view of the preferred unitary block assembly 90 of the CFV 10 of FIGS. 2 and 3, exploded to show the three block assemblies 90a, 90b, and 90c that unite to form unitary block assembly 90.

Figure 4B:
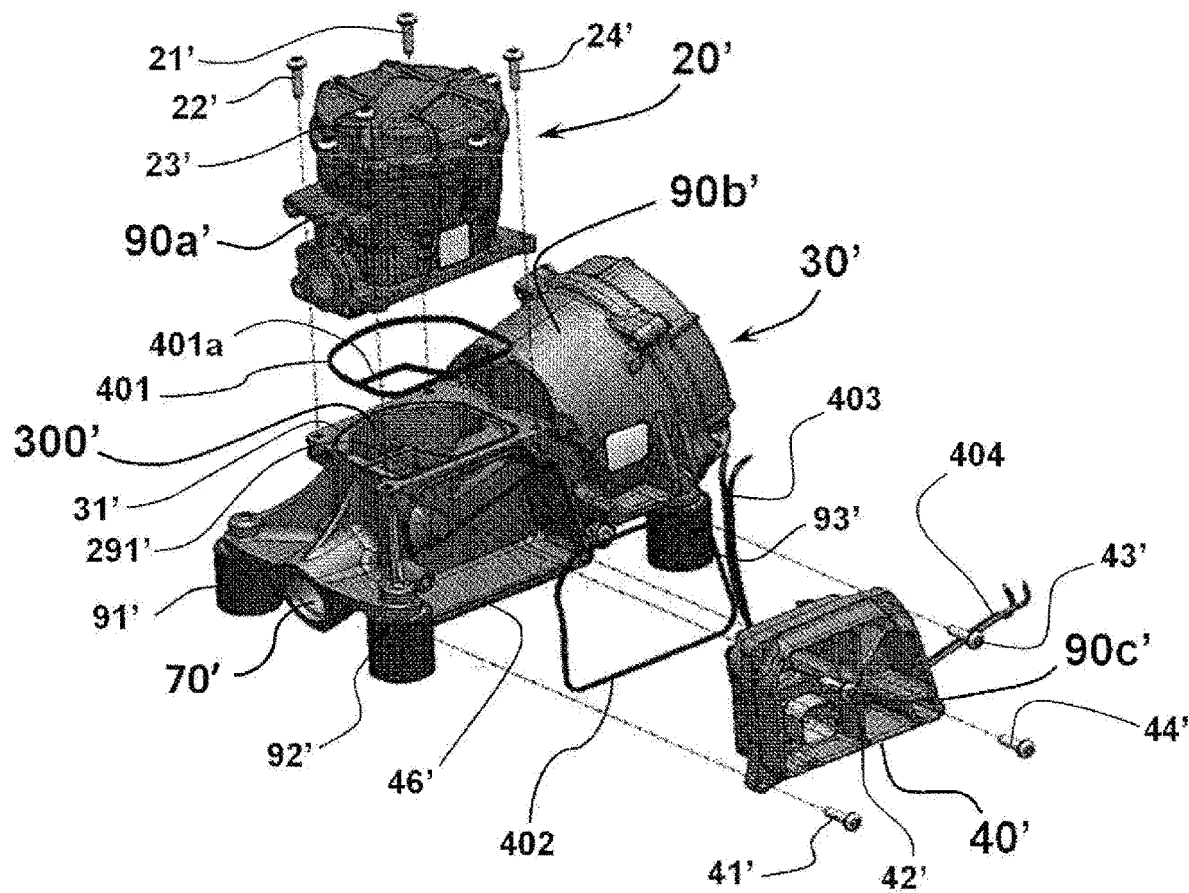

FIG. 4B illustrates an exploded view of an alternative embodiment of the preferred unitary block assembly 90 and its sub-blocks 90a, 90b, and 90c.

Figure 5:
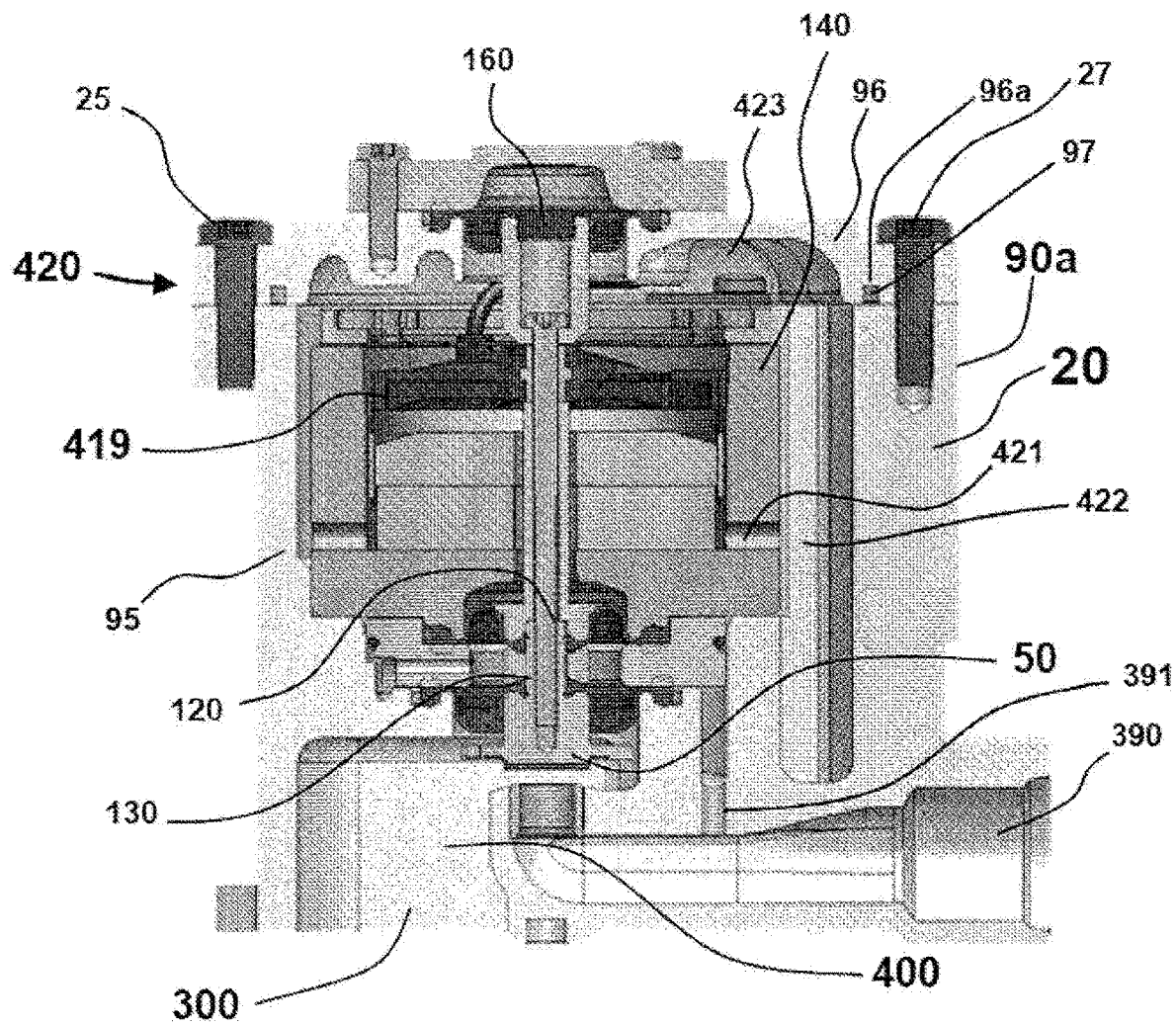

FIG. 5 is an enlarged sectional view of the first stage 20 of the CFV 10, showing the same view as in FIG. 3, but only those portions that make up block assembly 90a.

Figure 6:
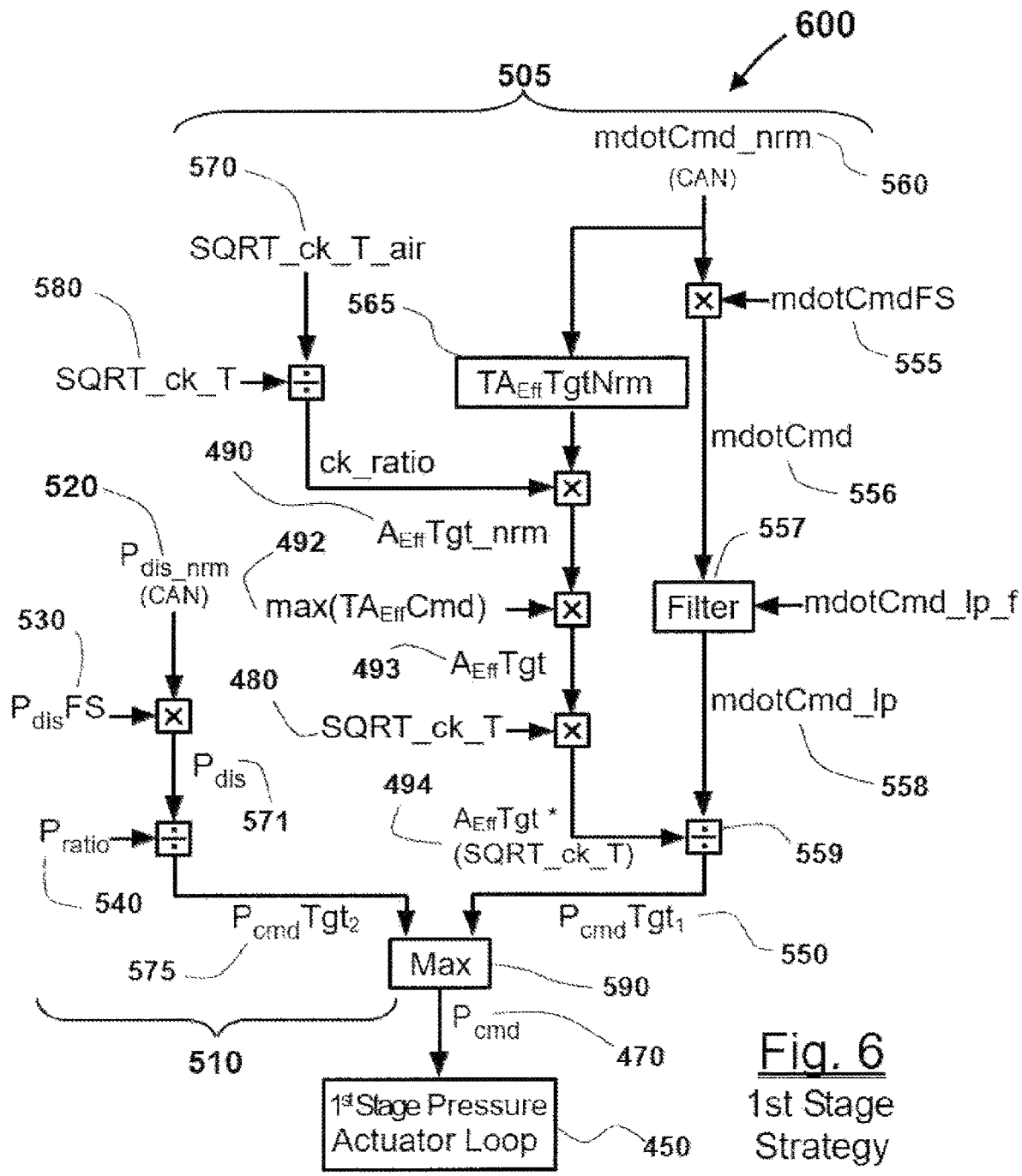

FIG. 6 is a block diagram illustrating the control strategies for the first stage 20 of the CFV 10, in accordance with some preferred embodiments.

Figure 7:
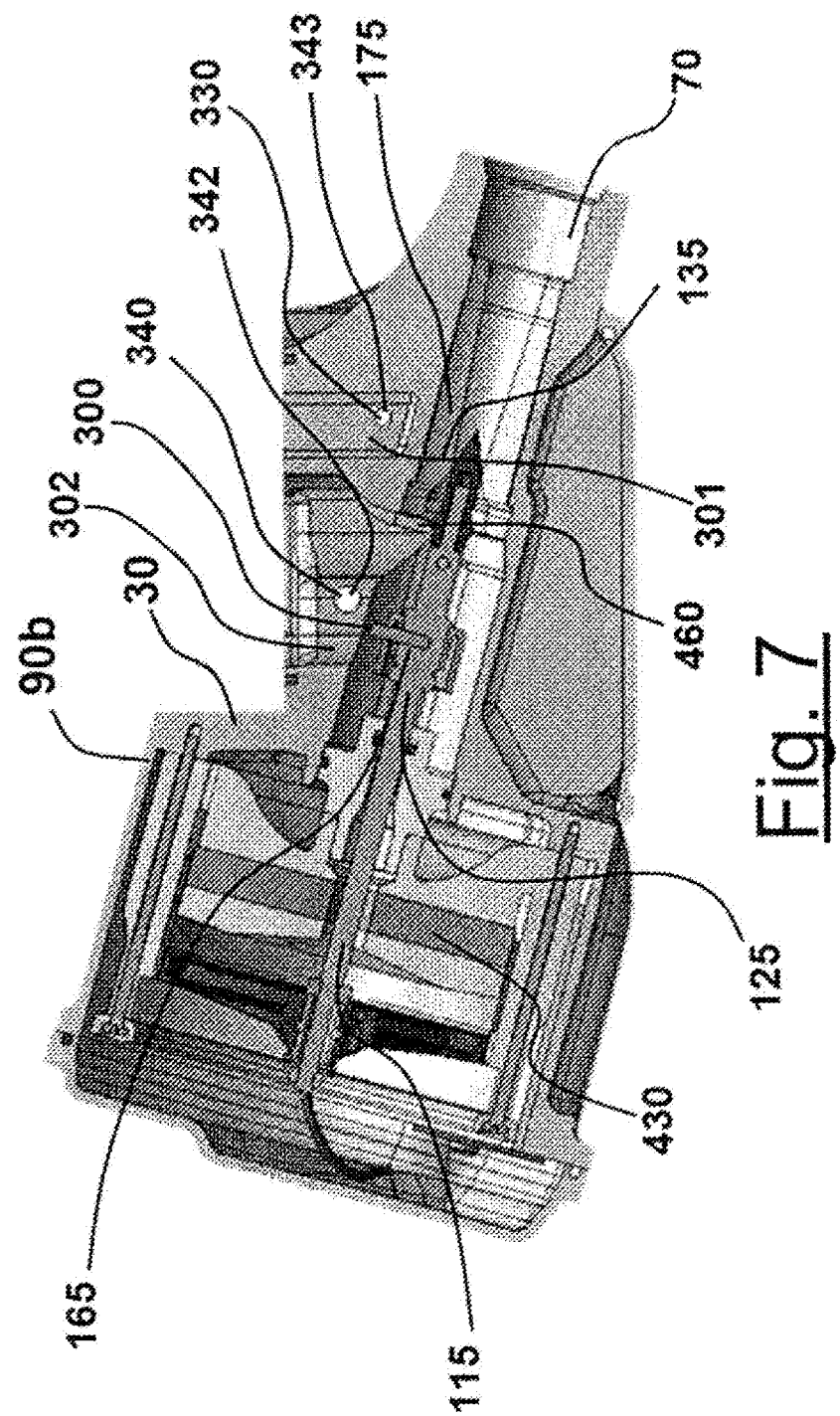

FIG. 7 is an enlarged sectional view of the second stage 30 of the CFV 10, showing the same view as in FIG. 3, but only those portions that make up block assembly 90b.

Figure 8:
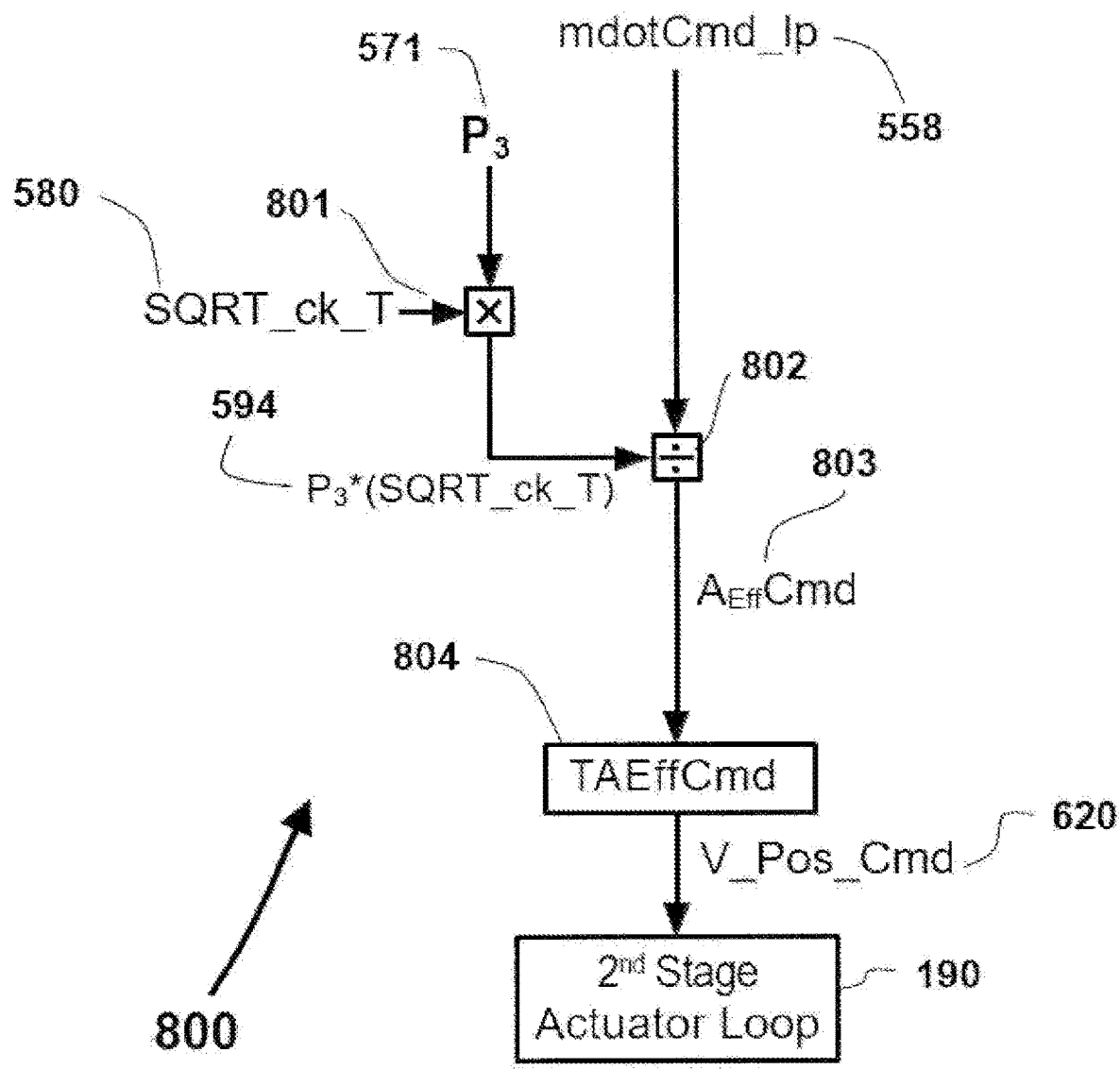

FIG. 8 is a block diagram illustrating the control strategies for the second stage 30 of the CFV 10, in accordance with some preferred embodiments.

FIG. 9 is a graph illustrating a flow curve that depicts operating characteristics of CFV 10, particularly when adapted for use with a 300 horsepower variation of engine 270.

FIGS. 10A, 10B, and 10C illustrate three orthogonal views of an embodiment of a central valve member 125, specifically, a side view, a top view, and an end-on view, respectively.

Figure 10D:
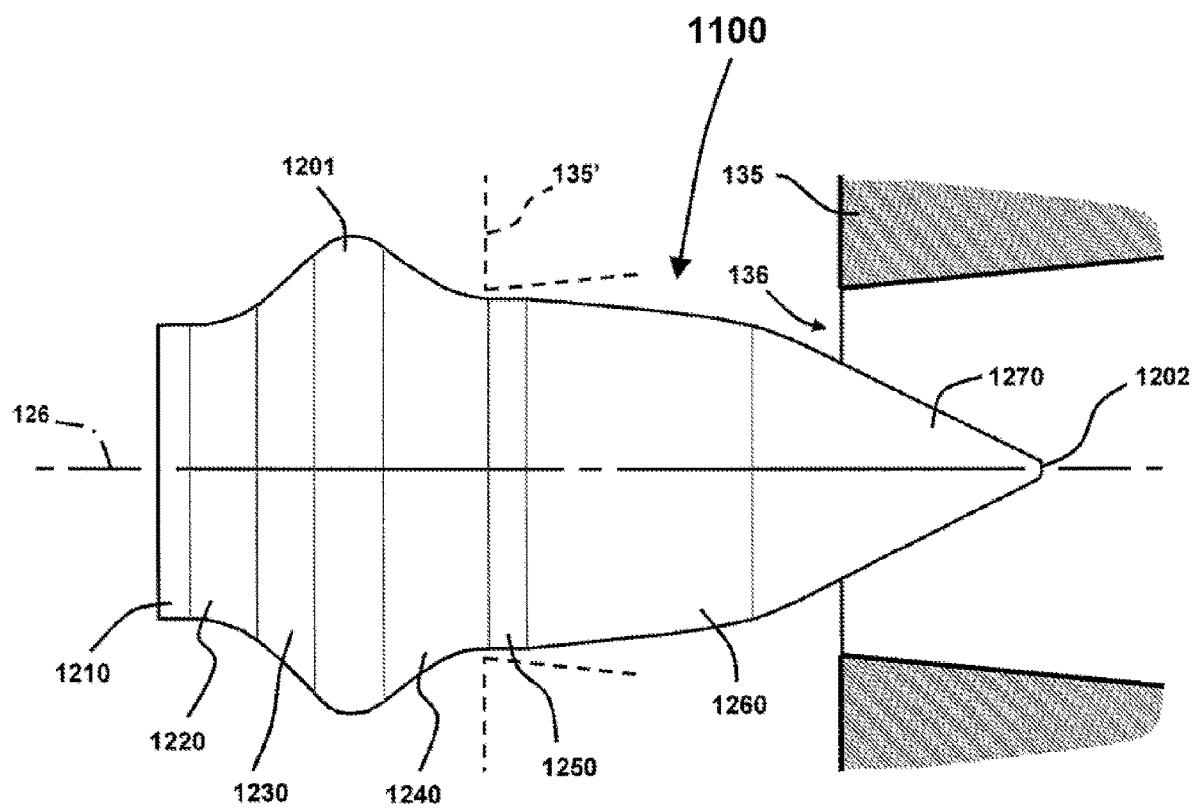

FIG. 10D is a detail view of flow surface 1100 of central valve member 125, showing operative orientations relative to orifice 135.

DETAILED DESCRIPTIONS OF PREFERRED EMBODIMENTS

The following examples are described to illustrate preferred embodiments for carrying out the invention in practice, as well as certain preferred alternative embodiments to the extent they seem particularly illuminating at the time of this writing. In the course of understanding these various descriptions of preferred and alternative embodiments, those of skill in the art will be able to gain a greater understanding of not only the invention but also some of the various ways to make and use the invention and embodiments thereof.

Wording Conventions

For purposes of these descriptions, a few wording simplifications should be understood as universal, except to the extent otherwise clarified in a particular context either in the specification or in any claims. For purposes of understanding descriptions that may be basic to the invention, the use of the term "or" should be presumed to mean "and/or" unless explicitly indicated to refer to alternatives only, or unless the alternatives are inherently mutually exclusive. When referencing values, the term "about" may be used to indicate an approximate value, generally one that includes a standard deviation of error for any particular embodiments that are disclosed or that are commonly used for determining or achieving such value. Reference to one element, often introduced with an article like "a" or "an", may mean one or more, unless clearly indicated otherwise. Such "one or more" meanings are most especially intended when references are made in conjunction with open-ended words such as "having," "comprising" or "including." Likewise, "another" may mean at least a second or more. Other words or phrases may have defined meanings either here or in the accompanying background or summary descriptions, and those defined meanings should be presumed to apply unless the context suggests otherwise.

These descriptions occasionally point out and provide perspective as to various possible alternatives to reinforce that the invention is not constrained to any particular embodiments, although described alternatives are still just select examples and are not meant to represent an exhaustive identification of possible alternatives that may be known at the time of this writing. The descriptions may occasionally even rank the level of preference for certain alternatives as "most" or "more" preferred, or the like, although such ranked perspectives should be given little importance unless the invention as ultimately claimed irrefutably requires as much. Indeed, in the context of the overall invention, neither the preferred embodiments nor any of the referenced alternatives should be viewed as limiting unless our ultimate patent claims irrefutably require corresponding limits without any possibility for further equivalents, recognizing that many of the particular elements of those ultimate patent claims may not be required for infringement under the U.S. Doctrine of Equivalents or other comparable legal principles. Having said that, even though the invention should be presumed to cover all possible equivalents to the claimed subject matter, it should nonetheless also be recognized that one or more particular claims may not cover all described alternatives, as would be indicated either by express disclaimer during prosecution or by limits required in order to preserve validity of the particular claims in light of the prior art.

As of the date of writing, the structural and functional combinations characterized by these examples are thought to represent valid preferred modes of practicing the invention. However, in light of the present disclosure, those of skill in the art should be able to fill-in, correct or otherwise understand any gaps, misstatements or simplifications in these descriptions.

For descriptive reference, we categorize fuel flowrate setpoint accuracy as being "generally accurate" if it is consistently within 5% of the demanded flowrate across its entire operating range. When consistently within 3% of the demanded flowrate across the entire range, setpoint accuracy can be categorized as "highly accurate." At the extreme, when setpoint accuracy is consistently within about 1% of the demanded flowrate across the entire operating range, it can be classified as "extremely accurate."

To the extent not otherwise understood by those skilled in the art, with regard to operating ranges, "large" can mean ranges corresponding to dynamic power ranges of more than 12:1. "Very large" is meant to correspond to dynamic power ranges of about 50:1 or greater, and "extremely large" corresponds to dynamic power ranges of 100:1 or greater.

With respect to any valve or valve actuator, "fast-acting" is a term that is generally understood by those of skill in the art, and should be presumed to generally mean that it is designed to act or respond considerably faster or quicker than most valves or valve actuators. More limited definition may be applied to the phrase to the extent expressly disclaimed during prosecution or to the extent necessary for preserving validity of particular claims in light of the prior art. Despite the presumed broader meaning, fast-acting actuators referenced in these descriptions are preferably operable to move the actuated valve element through its entire range of motion more than ten times per second (i.e., at more than 5 Hz). From another perspective, fast-acting actuators referenced in these descriptions are preferably operable to move the actuated valve element through most of its operable range of motion (particularly from 20% to 80% of stroke), if not all of that operable range, in fifty milliseconds or less. From another perspective, fast-acting actuators referenced in these descriptions preferably operate at a 10 Hz bandwidth or faster, with no more than 3 dB attenuation. For ideal responsiveness, the most preferred embodiments use voice coil actuators which characteristically operate much faster than 5 Hz, although many other types of actuators are still likely to be suitable as alternatives, especially to the extent particular claim elements are not expressly disclaimed to require particular fast-acting characteristics.

With respect to fuels, the term "fluid" is used herein to mean either a liquid or a gas, although liquid fuel embodiments are preferably adapted to vaporize the liquid phase of the fuel before the flow reaches the central CFV 10. In the context of a continuous-flow fuel flowrate control, a "continuous fluid passage" refers to a fluid passageway of any sort, whether defined through tubes, channels, chambers, baffles, manifolds or any other fluid passageway that is uninterrupted by fully closed valves, pistons, positive displacement pumps or the like during its normal operative mode of controlling the fuel flowrate, such that gaseous fluid is generally able to continually flow through a continuous fluid passage whenever a pressure gradient is present to cause such flow. It should be recognized, though, that a continuous fluid passage in this context can be regulated to zero flowrate by reducing the effective area of an opening to zero, while the passage would still be considered as a continuous fluid passage in this context. In addition, absent clear disclaimer otherwise, equivalent structures can be fully closed when not operating to control the flowrate, and equivalent structures may also may have parallel or alternate passageways where one or more may be interrupted without discontinuing the overall flow.

Figure 1:
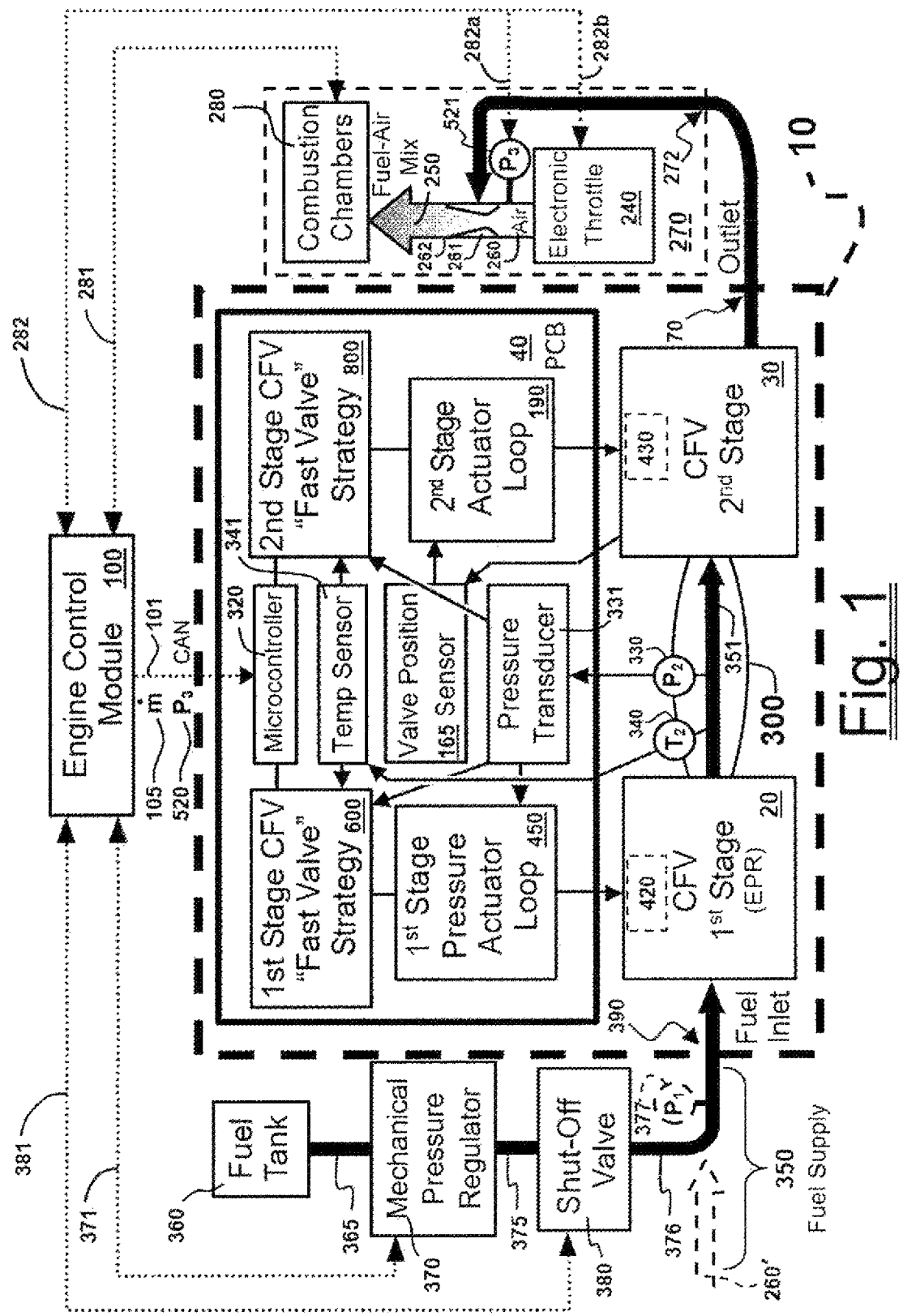
FIG. 1 is a block diagram illustrating a preferred embodiment of a gaseous fuel supply system with a dual-stage continuous-flow valve (CFV) 10, operatively integrated with an internal combustion engine 270 to provide highly accurate control of the gaseous fuel supply to that engine 270 in accordance with various teachings of the present invention.

FIG. 1—Block Diagram

In the illustrative block diagram of FIG. 1, there are three main segments of fuel flow depicted for preferred embodiments: (1) an upstream gaseous fuel supply 350 depicted on the left; (2) a dual-stage continuous-flow valve (CFV) 10 depicted within the dashed-line box in the middle; and (3) an engine 270 depicted in the smaller dashed-line box to the right. The three segments 350, 10, and 270 are operatively connected to provide rotary shaft power for any number of engine applications, with fuel supply 350 serving as the basic gaseous fuel supply for engine 270, and with CFV 10 serving to provide accurate control of the gaseous fuel flowrate from that fuel supply 350 to engine 270, in accordance with various teachings of the present invention.

Engine 270

Engine 270 is a spark-ignited internal combustion engine 270 of a type that uses gaseous fuel as its primary energy source, most preferably of a type that uses natural gas (NG) or vaporized propane (LPG) as its fuel. As is conventional, engine 270 has an engine control module (ECM) 100 or the equivalent, which continually monitors the operating conditions of various parts of engine 270 and its peripheral systems. Such an engine 270 may be operatively incorporated in any number of powered applications in alternative embodiments, some of which include incorporation in buses, trucks, forklifts, tractors, ships, and other vehicles or portable power systems, as well as many other applications that may be now or in the future known in the art for being powered by spark-ignited gaseous-fuel internal-combustion engines.

ECM 100 of engine 270 is connected via data communication lines 281-282 or other conventional means to monitor pressures, temperatures and operating states in or around numerous subsystems of engine 270, such as its air handling system (that preferably includes a turbo charger and intercooler), its throttle 240, its ignition system, its combustion chambers 280, its coolant system, its oil pressure, and its exhaust system, amongst others as are known in the art. Although alternative embodiments may use wireless connections for some or all of the data connections between ECM 100 and the various subsystems of engine 270, preferred embodiments of ECM 100 are connected to send and receive analog or digital signals through wire harnesses or other forms of communication lines 101, 281, 282, 282*a*, 282*b*, 371, and 381. Though represented in FIG. 1 by the various dotted-line communication links directly between the various components, communication lines 101, 281, 282, 282*a*, 282*b*, 371, and 381 are preferably embodied in the form of a conventional data network, such as a controller-area-network ("CAN") network.

As will be understood by those skilled in the art, ECM 100 is programmed to operate, in part, to determine the desired fuel flowrate ("iii" or "mdot") 105 at any given instant in time, based on current operating conditions of engine 270 in comparison to current user demands. As the desired in flowrate is determined by ECM 100, the ECM produces a corresponding in data signal 105 that represents the current in flowrate demand for engine 270. In keeping with the teachings of the present invention, preferred embodiments of engine 270 also incorporate CFV 10, which is operatively connected with engine 270 in a conventional manner using engine mounts 91-94 (shown in FIGS. 2-4A, numbered as 91'-93' in the embodiment of FIG. 4B), as well as other fluid and electrical connections. As the desired in flowrate is determined by ECM 100, the corresponding in data signal 105 is conveyed by communication link 101 to the microcontroller 320 of CFV 10, and CFV 10 operatively serves to instantaneously and accurately deliver as much from CFV outlet 70.

After the flow control by CFV 10, the controlled flow of gaseous fuel from the CFV outlet 70 is directed to engine 270 where it is preferably mixed with air 260 in a mixer 261, to produce a combustible fuel-air mix 250. Fuel-air mixer 261 is preferably a venturi-like mixer or another type that does not use moving parts in the fuel flow, thereby maximizing durability and fuel/air mixture homogeneity of flow conditions actually delivered to combustion chambers 280. Most preferably, fuel-air mixer 261 is in a form that includes a fuel ring, to help preserve the benefit of the accurate in flowrate control provided by CFV 10.

The intake air 260 that is directed into the fuel-air mixer 261 may be drawn from ambient air in alternative embodiments, with or without pressure compensators, albeit with performance compromises. More preferred embodiments, however, use a flow of air 260 from a turbocharger system, preferably together with an associated intercooler. The flow of air 260 is controlled by throttle 240, which is preferably an electronic throttle that further facilitates preservation of the accurate flowrate control provided by CFV 10.

Once the proper fuel-air mixture 250 is provided by fuel-air mixer 261, that mixture 250 is then operatively introduced into combustion chambers 280 of engine 270 under valve control from ECM 100. Within combustion chambers 280, the air/fuel mixture 250 is then operatively spark-ignited to cause working combustion.

Multi-Stage CFV 10

Linked to the ECM 100 of engine 270 via the communication link illustrated by dotted line 101, dual-stage CFV 10 is adapted to provide rapid and extremely accurate control of the actual in fuel flowrate at its outlet 70 in response to the in flowrate signal 105, for controlled delivery of the continuous-flow fuel supply to engine 270. By its nature, CFV 10 is used to control gaseous fuel flow from a primary fuel supply 350 (on the left in FIG. 1) to an internal combustion engine 270 (on the right in FIG. 1). Accordingly, CFV 10 is operatively positioned downstream of the fuel supply 350 and upstream of the engine 270, such that it is plumbed and sealed to be part of a fluidly continuous fuel supply system during operation of engine 270, with CFV 10 being intermediate the fuel supply 350 and the engine 270.

As added background, many fuel flow control valves in continuous-flow systems use a continuous fluid passage that remains generally open throughout active operation, while the control valve controls the effective size of a variable opening within that passage to effect the in flowrate therethrough. Although the actual flow velocity also varies with orifice size in practice, different in flowrates can theoretically be achieved by different valves for the same flow velocity. The actuators for such valves control the effective size of the variable opening. When that effective size is small enough relative to any downstream restrictions, the velocity of the fuel flow through the opening becomes sonic or supersonic, which is referred to as "choked" flow.

Preferred embodiments of the present invention also control the size of at least one opening 136 to control the in flowrate therethrough, but presently preferred embodiments do so from a multi-stage approach, where at least two stages 20, 30 are coupled within a unitary block assembly 90 and are interdependently coordinated by a commonly-contained microcontroller 320. The multiple stages 20, 30 are preferably coordinated by microcontroller 320 to provide a multi-stage CFV 10 that consistently achieves choked flow through opening 136 at actual in flowrates that accurately and continuously meet the instantaneous in flowrate demands 105. To enable performance for an engine 270 operating over a large dynamic power range, the multiple stages 20, 30 of CFV 10 are preferably juxtaposed so that the fuel control passage is sealed within a common block assembly 90 together with a printed circuit board (PCB) 40 having an onboard microcontroller 320. With microcontroller 320 also being contained within the same unitary block assembly 90, microcontroller 320 is therefore referred to as an "in-block" microcontroller 320. CFV 10, hence, includes at least three basic subassemblies 20, 30 and 40 that are operatively connected within a unitary block assembly 90.

By virtue of the rapid and accurate control coordinated by the in-block microcontroller 320, CFV 10 is equipped and controlled to instantaneously achieve that desired in flowrate 105 in the course of its intended operation. Although other data inputs such as a $P_3$ input signal 520 are also used in preferred embodiments, many embodiments of CFV 10 are able to achieve rapid and accurate flowrate control without any external data input other than electronic data signal 105 that represents the desired in flowrate, which will probably always be received by the CFV microcontroller 320 of printed circuit board (PCB) 40 as a data signal 105 from the ECM 100.

In practice, the major operations of a preferred dual-stage version of CFV 10 are represented by the block components illustrated in FIG. 1. Its first stage 20 is preferably a pressure-balanced electronic pressure regulator, which is situated upstream of the second stage 30 so as to control and modulate the interstage pressure $P_2$ flowing into the second stage 30. From first stage 20, fuel flow is then directed to the second stage 30, which includes a fast-acting valve 125 that preferably controls choked flow through a fixed orifice 135, and the resulting extremely accurate choked fuel flow is then delivered from CFV outlet 70 to the engine 270 for combustion. As described elsewhere, accurate choked flow is achieved by controlling the effective size of an opening 136 in the orifice 135 within second stage 30, while the second stage operation is interdependently coordinated by in-block microcontroller 320 with the electronic pressure regulator of first stage 20, to optimize full-range flowrate setpoint accuracies, preferably to an extremely accurate level.

Upstream Fuel Supply 350

As illustrated in FIG. 1, fuel supply 350 preferably includes a fuel tank 360 serving as the source for fluid fuel, together with a mechanical pressure regulator 370 and other conventional components such as a shut-off gate valve 380. Valve 380 is preferably controlled by ECM 100, although independent control may be utilized in alternative embodiments. The gaseous fuel supply 350 is equipped and adapted to deliver a continuous-flow gaseous fuel supply to CFV inlet 390, preferably at a gauge pressure in the range between 60 and 85 psig at CFV inlet 390.

More preferably, the gaseous fuel supply 350 is a natural gas or vaporized propane fuel supply that delivers natural gas or propane stored in fuel tank 360. Though not shown in FIG. 1, fuel tank 360 may be equipped with vaporization subassemblies and controls to manage LNG (liquefied natural gas) or propane vaporization and resulting pressure within fuel tank 360 and the associated lines 365, 375 and 376. Such vaporization subassemblies and controls for LNG preferably prime tank 360 by pre-circulating some of the stored LNG through a heat exchange loop that increases the temperature of the pre-circulated LNG to the point of partial or complete vaporization, thereby creating a vapor phase with an adequate pressure head within tank 360. Line 365 preferably also includes a second heat exchanger downstream of the fuel tank 360, to further aid in complete vaporization of the LNG or propane once gaseous fuel is allowed to flow from fuel supply 350 to CFV 10.

Downstream of the heat exchanger in line 365, the gaseous fuel is directed sequentially through a mechanical pressure regulator 370, a downstream fuel shut-off valve 380, and a line quick-disconnect assembly (not shown) prior to entry into CFV 10. In this embodiment, initial fuel pressure is supplied by the tank 360, although the initial pressure from tank 360 is preferably regulated by mechanical pressure regulator 370 before reaching inlet 390 of CFV 10. Mechanical pressure regulator 370 is able to manage the relatively high pressures from tank 360 and includes one or more conventional pressure regulators that use pressure-balanced diaphragms to vary effective orifice sizes and thereby control the pressure to within the preferred range (60 to 85 psig) at CFV inlet 390. Although not critical, mechanical pressure regulator 370 preferably includes an integrated pressure sensor for providing upstream pressure data (i.e., equivalent to the pressure "$P_1$" at CFV inlet 390) to ECM 100 via control link 371. In addition to, or as an alternative to, a pressure sensor integrated with regulator 370, alternative embodiments may also include a stand-alone pressure sensor 377 in line 376, which is in fluidic proximity to CFV inlet 390, for more reliable input on the actual pressure of the gaseous fuel entering CFV 10. Despite the benefits of knowing the upstream pressure $P_1$, it should be recognized that CFV 10 can function without knowing the value of the upstream pressure $P_1$, albeit with some limitations.

Assuming all lines 365, 375 and 376 are operatively sealed and connected to direct fuel flow therethrough, fuel flow from fuel supply 350 to CFV 10 is enabled or disabled by On/Off operation of a mechanical shut-off valve 380. Although manual valves may be used in certain alternative embodiments, valve 380 is preferably motor or solenoid actuated via oversight control by ECM 100, as illustrated by the dotted-line control link 381 in FIG. 1. When shut-off valve 380 is open, gaseous fuel flow is induced by an operable pressure gradient between tank 360 and CFV inlet 390. Hence, with valve 380 open, fuel first moves through the heat exchanger and the mechanical pressure regulator(s) 370, and the fuel is then directed through the valve 380 and into the CFV inlet 390.

Despite vaporization subassemblies and controls, the potential exists for the passage of vaporized natural gas or propane fuel that also contains droplets of liquid phase LNG or propane, which may occur for instance if the ports or conduits for heat exchange fluids become clogged. If any LNG or propane droplets remain in the fuel stream downstream from the mechanical pressure regulator(s) 370, their subsequent vaporization may introduce dramatic pressure spikes into CFV 10, which under certain conditions may overwhelm the first stage 20 or other components of CFV 10. In order to compensate for the possible introduction of LNG or propane droplets downstream of the heat exchanger, a pressure control loop may be inserted into the system in a position intermediate between the pressure regulator(s) 370 and the inlet 390 to CFV 10, preferably downstream of the heat exchanger and mechanical pressure regulator(s) 370, and preferably upstream of any upstream pressure $P_1$ sensor 377.

In the event any errant droplets of LNG or propane enter into CFV 10, the delayed vaporization would likely lead to a spike of increased pressure at the inlet 390 of the CFV 10. If such a pressure spike is produced, the inserted pressure control loop preferably buffers the spike by venting back to the upstream side of the mechanical pressure regulator 370. Some alternative embodiments address such overpressure risks through use of a signal from an upstream pressure $P_1$ sensor 377 in line 376. In such alternatives, to the extent an overpressure condition is detected by $P_1$ sensor 377, ECM 100 is adapted to make other adjustments in order to resolve or otherwise compensate for the pressure spike. As other alternatives, one or more overpressure vents or bypass check valves can be included in line 375 and/or 376 to help divert vaporization spikes that would otherwise propagate and disrupt the control of CFV 10. Similarly, pressure spikes due to fuel vaporization upstream of the mechanical pressure regulator can also be vented to atmosphere and/or diverted to other containment further upstream in fuel supply 350.

By providing a multi-faceted strategy for control of such errant pressure spikes, namely through the inclusion of a heat exchanger in line 365 as well as one or more of the vents, check valves or the like as discussed above, preferred embodiments control and modulate the pressure introduced to the CFV inlet 390 to reduce or prevent overwhelming the flowrate control of CFV 10.

The fuel tank 360 may alternatively be embodied as any of a number of commonly available gaseous fuel sources, such as stationary gas pipelines, compressed gas cylinders, or other types of liquefied storage tanks with vaporization controls, together with conventional pressure regulators and the like. Preferably, most such alternatives still include some form of a fuel storage tank 360 that feeds fuel to CFV 10 via a high-pressure mechanical pressure regulator 370 which regulates the pressure to a desired range for the CFV inlet 390.

Again, from the high-pressure mechanical pressure regulator 370, the fuel is fed through a fuel tube or supply line 375, which preferably includes a shut-off gate valve 380 as shown. Downstream from shut-off gate valve 380, the fuel supply line 376 is connected to the CFV 10 at CFV fuel inlet 390, at which point the fuel is preferably introduced into a first stage 20 of CFV 10.

As will be understood by those of skill in the art, the supply line 375 may also include a fuel filter (not shown) or other conventional systems for monitoring and/or optimizing fuel supply conditions prior to introduction into CFV 10. Such other systems may include, for instance, fuel quality sensors connected to the engine control module 100 and/or the PCB 40 of CFV 10 for anticipating operating needs. The fuel supply 350 may also include a combination of several independent pressure regulators 370 (rather than just one), or may include additional pressure regulators that are integral to the fuel storage tank 360.

Referring again to the most preferred embodiment as illustrated, the larger fuel system includes a fuel supply 350 having a dual-stage CFV 10. Downstream of that larger fuel system, the supplied fuel flow is then blended with air 260 for supplying a gaseous fuel-air mix 250 to internal combustion engine 270. While the FIG. 1 arrangement is preferred, alternative embodiments in line with some broader teachings of the present invention may alternatively introduce some or all of the required air into the fuel either upstream of CFV 10 (as suggested by alternate air mixing flow arrow 260') or possibly even in the midst of CFV 10, albeit with corresponding challenges and possible compromises given that corresponding adjustments may be needed to account for the air flow introduction at whichever point it is introduced.

Preferred Unitary CFV Block Assembly 90

With reference to FIGS. 2-4A, the integration of the three basic subassemblies 20, 30 and 40 of CFV 10 within a unitary block assembly 90 is illustrated. The unitary block assembly 90 is a rigidly-integrated combination of three aluminum sub-blocks 90a, 90b, and 90c, which in turn incorporate unions of still smaller aluminum block elements for operable containment of those basic subassemblies 20, 30 and 40. Sub-block 90a generally contains first stage 20; sub-block 90b generally contains second stage 30; and sub-block 90c generally contains PCB 40 and its in-block microcontroller 320.

As shown, the first stage 20 is generally oriented above the second stage 30 in each of FIGS. 2-4A. Preferably, unitary block 90 is achieved by rigidly mounting the blocks 90a and 90c of the first stage 20 and PCB 40, respectively, to the block 90b of the second stage 30. The rigid mounting as illustrated positions the first stage outlet 400 and the second stage inlet 460 in a common space referred to as interstage chamber 300. Interstage chamber 300 is an intermediate space shared in common between the two stages 20, 30 and provides a sealed open space in the fluid passageway of CFV 10. Hence, the flow from the first stage 20 is openly communicated to the second stage inlet 460, albeit in a sealed space such that pressure and fuel are not lost from the block 90.

As will be understood, the interstage chamber 300 (conceptually illustrated with hidden lines in FIG. 2) is formed (at least in part) by the sealed union between the sub-blocks 90a, 90b, 90c, which produces the combined unitary CFV block 90. In addition to being integrally joined to form a unitary block 90, the mating surfaces that enclose the basic sub-assemblies 20, 30 and 40 are hermetically sealed with gaskets, adhesives, seals, threaded bolts, O-rings, and the like sufficient to contain internal pressures in excess of the maximum operating pressure to be conducted through CFV 10. The maximum CFV operating pressure is preferably at least 85 psig, although the seals and the like between and within the sub-blocks 90a, 90b, 90c are preferably designed for containment of more than 100 psig and, preferably, up to more than 320 psig, as a safety factor. Although different sealing techniques may be used as are known in the art, machine screws and adhesive and/or room temperature vulcanizing (RTV) silicone are most preferred in order to achieve an adequate seal between the various mating surfaces of sub-blocks 90a-90c.

With reference to FIGS. 2-4A, for instance, threaded bolts 21-24 unite first stage block 90a to second stage block 90b with seals therebetween, to sealingly enclose and define interstage chamber 300 between the two stages 20, 30. Likewise, bolts 41-44 unite PCB sub-block 90c to second stage block 90b in a sealed manner such that the space around PCB 40 and its components are also sealed, to prevent pressure leakage from around PCB 40 in case pressures leak from chamber 300 to PCB 40 along wires or transducer ports such as ports 342, 343 (numbered in FIG. 7).

Although the associated polymer seals are not clearly shown in FIGS. 2-4A, circumferential grooves 31 and 46 are visible, in which continuous elastic seals are inserted and compressed during assembly. Such seals serve to ensure adequate pressure containment in chamber 300 and around PCB 40, respectively. For comparison, comparable elastic seals 401 and 403 are shown in the alternative embodiment of FIG. 4B, which fit in comparable circumferential grooves 31' and 46' for similar purposes in that alternative embodiment.

Again, each of sub-blocks 90a, 90b, and 90c, in turn, involve sealed rigid unions of smaller block elements. For instance, as seen more clearly in FIG. 5, block 90a includes a main part 95 and a cap part 96 sealingly united together by threaded bolts 25-28 (partially numbered in FIG. 2) in a manner that captures elastic seal 97 in a circumferential groove 96a. Other comparable unions between smaller block elements are reflected in the drawings, each of which serves to ensure an adequate seal to contain operative pressures within the common block assembly 90. As will be understood to those of ordinary skill in the art, many other configurations and alternative materials can be substituted for the various sub-blocks and the smaller block elements while still containing the operative pressure in a rigid block assembly despite the various unions and moving parts, to serve the purpose of unitary block assembly 90 in alternative embodiments.

First Stage 20 of CFV 10

In preferred configurations, the first stage 20 of CFV 10 essentially functions as an electronic pressure regulator 330 that is controlled by PCB 40. The first stage 20 includes the CFV fuel inlet 390 and first stage fuel outlet 400. First stage 20 controls the pressure at the first stage outlet 400 (in interstage chamber 300) using a conventional electronic pressure regulator structure for creating a variable effective area of valve 50 for a continuous-flow system.

As better shown in FIG. 5, the effective area of valve 50 in the first stage 20 is controlled by an actuated disc 419 that is pressure-equalized by surrounding passages 421-423. The position of the actuated disc 419 is moved and controlled by electromotive force from surrounding element 140. The actuated disc 419, in turn, controls movement of valve shaft 120 to control position of valve 50, which is a pressure-balanced diaphragm valve, the effective area of which changes based on the axial position of valve 50. Valve 50 itself is pressure-balanced by inlet pressure from port 391.

For ideal responsiveness, the first stage actuator 420 is preferably a fast-acting actuator, preferably a voice coil actuator, that produces an actuating force on the pressure-balanced valve 50 in order to achieve strategic pressures at the first stage pressure outlet 400 (and, hence, in the interstage chamber 300), according to control provided by PCB 40.

In the preferred embodiment, the first stage valve actuator 420 has a 1.75" diameter, a 2 to 3 pound force, and a 3.5 mm stroke. The first stage 20 of CFV 10 preferably has a force balance diaphragm 440 functioning in a seat geometry capable of operating with a 4:1 turndown ratio.

In at least one alternative embodiment of certain aspects of the invention, the first stage 20 of CFV 10 also has a port (not shown) for intake air, although such a port is not part of the illustrated preferred embodiment.

Further details of the first stage 20 of CFV 10 will be evident from the other illustrations and related descriptions provided herein, particularly with reference to FIGS. 5 and 6. Under control of the PCB 40— particularly, under control of the algorithms depicted as "1$^{st}$ Stage CFV Strategy" 600 and the Pressure Actuator Loop 450 in FIG. 1—the vaporized LNG fuel 350 from the first stage 20 of CFV 10 is provided at a controlled pressure to the first stage outlet 400.

First stage outlet 400 is in direct fluid communication with the second stage inlet 460, through an unrestricted interstage chamber 300 sealed within the unitary block assembly 90. Hence, the controlled flow 351 from the first stage 20 flows directly into the second stage 30 without opportunity for outside influences.

Second Stage 30 of CFV 10

In the preferred configuration illustrated in FIG. 7, the second stage 30 of CFV 10 includes a fast-acting choked-flow valve 125 that is controlled by the same PCB 40 as first stage 20 such that the two stages 20, 30 are inter-dependently coordinated according to the control strategies of FIGS. 6 and 8 (described further in other sections of these descriptions). Although sub-sonic or near-sonic flow or the equivalent may be manageable with alternative embodiments modeled based on transitional flow equations, particularly preferred embodiments are controlled to produce choked flow with sonic or supersonic in flowrates in the second stage 30 of CFV 10. For purposes of such alternative embodiments, "near-sonic" velocity means in the range of 0.90 to 0.99 sonic, and "sub-sonic" velocity means less than 0.90 sonic.

The second stage 30 has its own fuel inlet 460 that is fully sealed within unitary housing 90 (in the intermediate chamber 300). Second stage 30 has its own fuel outlet 70, which also serves as outlet for the entire CFV 10. Second stage 30 fundamentally has a continuous-flow valve 125 configured between its inlet 460 and its outlet 70 that is preferably designed to achieve choked-flow of gaseous fuel therethrough during normal operation. Preferably, the continuous-flow valve 125 itself is in the form of an axially adjustable central valve member 125 that operatively positions a flow control surface 1100 in the flow path to define an effective valve opening 136 between surface 1100 and a concentric orifice 135. The valve actuator 430 (also referred to as a "voice coil actuator 430") for the second stage control 30 operates to create a variable effective area of opening 136 that directly controls the in flowrate of the fuel at the second stage outlet 70. The effective area of the second stage 30 is controlled by a highly responsive (i.e., fast-acting) actuator 430. For ideal responsiveness, the second stage actuator 430 is embodied as a fast-acting voice coil actuator that produces an actuating force on an actuator stem 115 of the central valve member 125. More responsive than many fast-acting actuators, voice coil actuator 430 is able to move central valve member 125 through its entire 16 mm range of motion in less than twenty milliseconds, preferably even in less than ten milliseconds.

The position control of actuator 430 is determined by PCB 40 in order to achieve the desired in flowrate at the second stage outlet 70 (which is also, in effect, the CFV outlet), depending largely on the conditions as sensed in the interstage chamber 300 of unitary block 90. The fluid conditions of the fuel flow within interstage chamber 300 are preferably detected by interstage $T_2$ and $P_2$ sensors accessing interstage chamber 300 via port 340.

FIG. 7 illustrates a detailed view of the second stage 30 of CFV 10 in a preferred embodiment of the central valve member 125. In preferred embodiments, the second stage CFV 30 has a central member shaft 115, central valve member 125 axially adjustable within a concentric valve orifice 135 of valve body 175 that is designed to allow second stage 30 fuel metering. The axial position of the central valve member shaft 115 is adjusted by changes to the current to the voice coil of actuator 430. For accurate control while optimizing responsiveness, the central valve member shaft 115 of the second stage 30 is associated with a valve position sensor 165, which determines the axial position of the shaft 115 irrespective of the balance of forces acting on the central valve member orifice 135 so that fuel metering is both monitored and modified as needed toward more optimal performance of the associated engine. As illustrated in FIG. 1, the valve position signal from that sensor 165 is then used for the valve actuator loop 190, which controls the position of the valve 125 relative to orifice 135.

In the preferred embodiment, the second stage 30 of CFV 10 has an actuator 430 of significantly greater force than the actuator 420 for the first stage 20. The second stage 30 is also preferably able to achieve a higher turndown ratio on its own as compared to the individual turndown ratio contributed by the first stage 20. More particularly, a particular example of the second stage 30 actuator 430 is embodied as an actuator with a 3" diameter, an 8 to 12 pound force, and a 16 mm stroke, although the room for substantial variations in such particulars will be evident to those of skill in the art for most aspects of the invention.

Further details of the second stage 30 of CFV 10 will be evident with reference to FIGS. 7 and 8 and related descriptions. The actuator 430 of the second stage of CFV 30 is controlled by the Valve Actuator Loop 190. FIG. 8, for instance, illustrates the control algorithm for the "Second Stage CFV Strategy" 800 and the "Valve Actuator Loop" 190 of the second stage CFV 30. (As with alternatives for the first stage 20, in alternative embodiments of certain aspects of the invention, the second stage control 30 of CFV 10 also has a port for intake air, although such a port is not part of the preferred embodiment.)

In preferred embodiments, the second stage 30 has a central valve member 125, in a position that is axially adjustable relative to a concentric valve orifice 135 under the operative influence of actuator 430. The shape of the flow control surface 1100 of valve 125 is designed to allow second stage 30 to meter fuel flowing through orifice 135 in a manner that enables consistent setpoint accuracy across the entire operating range of CFV 10. The axial position of the central valve member shaft 115 is adjusted by changes to the current of a voice coil actuator 430. For accurate control while optimizing responsiveness, the central valve member shaft 115 of the second stage CFV 30 is associated with a valve position sensor 165, which determines the axial position of the shaft 115 irrespective of the balance of forces acting on the central valve member orifice 135 so that fuel metering is both monitored and modified as needed toward more optimal performance of the associated engine. As illustrated in FIG. 1, the valve position signal from that sensor 165 is then used for the valve actuator loop 190, which controls the position of the valve 125 relative to orifice 135.

Printed Circuit Board (PCB) 40

For further optimization, the in-block microcontroller 320 and related control circuitry are preferably embodied on a single printed circuit board 40 (also visible in FIG. 4A) that includes transducers in communication with the interstage chamber 300 between the two stages 20, 30. The in-block microcontroller 320 of PCB 40 is connected via data link 101 to receive the in data signal 105 (and other available data, including a $P_3$ data signal 520, discussed elsewhere herein) from ECM 100. Data link 101 connects to ECM 100 and its control network, which is a CAN network in the preferred embodiment, through a molded wire harness connector 45 that is rated for use across 100 psi or greater pressure differentials, to minimize risk of pressure leaks from chamber 300 through line 101. Using the received data signals 105, 520, the printed circuit board 40 controls the dual-stages 20, 30 of CFV 10, preferably without any external communication other than power and data connection 101 to the engine's ECM 100. As will be understood by those of skill in the art, alternative embodiments could be direct (0-5V) data connections or any other known alternative for data connections that are otherwise suitable for an application such as CFV 10.

With reference to FIG. 1, PCB 40 comprises a microcontroller 320, which can be any commercially available microcontroller with a memory that is capable of receiving machine readable code, i.e., software. The microcontroller 320 provides the "brains" of the CFV 10 and receives pressure signals from a pressure transducer 331, temperature signals from a thermistor 340, valve position signals from valve position sensors 160, 165, and control signals from the electronic control module (ECM) 100 and outputs a pressure and valve position command to the first 20 and second 30 stages of CFV 10, respectively.

Thermistor 340 is a conventional thermistor that senses temperature at its tip and has wire leads extending to the tip from a base 341, although other forms of temperature sensors (or even sensors or the like for fluid conditions other than temperature) can be considered for use as alternatives for some of the same purposes. In the preferred embodiment, optimal fluid condition feedback is obtained by positioning the sensor tip of thermistor 340 directly within interstage chamber 300, while the base 341 of thermistor 340 is soldered directly to PCB 40. With cross-reference to FIG. 7, although PCB 40 is behind the illustrated surfaces 302 of block 90*b* defining interstage chamber 300, the sensing tip of thermistor 340 extends slightly into chamber 340 through an appropriately positioned sensor port 342 in a side wall of chamber 300. In one embodiment, the pressure transducer 330 has an absolute pressure range from 0 to 100 psi, and the thermistor 340 has a temperature measurement range from −40° C. to 125° C.

Pressure transducer 331 is a conventional pressure transducer, although non-conventional ones (or even sensors or the like for fluid conditions other than pressure) can be considered for use as alternatives for some of the same purposes. Pressure transducer 331 is preferably of the type that can be mounted to a control board and has a stiff tube connector (sometimes called a "stove pipe") extending from its base, through which the transducer accesses the pressure to be sensed. In the preferred embodiment, optimal fluid condition feedback is obtained from transducer 331 by positioning the tip 330 of its stove pipe (or a tube therefrom, as an alternative) in direct fluid contact with interstage chamber 300, while the base transducer 331 is mounted directly on PCB 40. With further cross-reference to FIG. 7, the stove pipe tip 330 extends from PCB 40 (not shown, but behind the illustrated surfaces of block 90*b*) through an appropriately positioned sensor port 343 in a side wall 302 of chamber 300. To minimize clogging of tip 330 or other fouling of transducer 331, port 343 is preferably in a side compartment 301 of interstage chamber 300 and is shielded with baffled walls or the like as are known for use as contamination preventers.

Processor enclosure 90*c* contains in-block microcontroller 320 and associated circuitry components of single printed circuit board (PCB 40) for master control of all basic aspects of CFV 10. While electrical leads and the like from the PCB 40 enter into or close to the sealed interstage chamber 300, the PCB 40 is likewise preferably sealed within a dedicated space 300 created inside the unitary CFV block assembly 90, as can best be appreciated in FIGS. 4A and 4B. For additional protection of PCB 40, not only is it mounted in place with machine bolts 310, it is also both potted and encapsulated in its dedicated space. Such sealed integration enables optimal control and helps minimize extraneous artifacts or other influences that might otherwise affect its operation.

For purposes of control, the pressure transducer 330 and a conventional temperature sensor 340 monitor the pressure and temperature of the fuel in the interstage chamber 300 which is intermediate the first stage 20 and second stage 30.

Throughout the control of in-block microcontroller 320, embodiments of the present invention address long felt unresolved needs in the field through innovative approaches that overcome many of the limitations and challenges of the prior art. In accord with many of the teachings of the present invention, the industry is enabled to provide solutions manifested in dual-stage continuous-flow control systems that are readily adaptable to the power demands of numerous applications and are readily for capable of accurately and precisely controlling fuel flow across sizable dynamic power ranges in internal combustion engines.

FIG. 4B—Comparable Alternative CFV 10'

FIG. 4B illustrates a comparable alternate embodiment of CFV 10, in the form of CFV 10'. CFV 10' is structured and functions much the same as CFV 10, such that like components of each are numbered the same but for an added prime ['] symbol for components of CFV 10'. Similar to block assembly 90 of CFV 10, the unitary block assembly 90' of CFV 10' includes a rigidly integrated combination of three sub-blocks 90*a'*, 90*b'*, and 90*c'*. From the perspective of FIG. 4B, the alternate embodiment of CFV 10' shows seals 401 and 402. Seals 401 sealingly surround the union between first stage sub-block 90*a'* and second stage sub-block 90*b'*. Seal 402 likewise sealingly surrounds the union between PCB sub-block 90*c'* and sub-block 90*b'*. The resulting unions form unitary block 90'—a sealed unitary housing for internal valve components of CFV 10. In one embodiment, CFV 10' can also contain internal pressures of at least 320 psig. Microcontroller 320' and associated circuitry are preferably mounted on a single printed circuit board (PCB 40') for controlling all basic aspects of CFV 10'.

Within the unitary block assembly 90', wires 403 and 404 run from PCB 40' in sub-block 90*c'* to the actuators 420 and 430 in sub-blocks 90*a'* and 90*b'*, respectively, to operatively connect the various components of CFV 10'. Specifically, wires 403 and wires 404 can link components of the unitary block assembly 90' to its other components. Wires 403, in particular, are provided with a separate channel 291' (with a corresponding channel identified as 291 in FIG. 4A) defined separately from chamber 300' (as indicated by the divided seal 401*a* in FIG. 4B) to connect PCB 40' to actuator 420'. Wires 404 similarly connect through a separate channel in sub-block 90*b'*.

First Stage Control Strategy

With cross-reference between the diagram of FIG. 1 and the first stage logic tree of FIG. 6, the actuator 420 of the first stage 20 of CFV 10 is controlled by the Pressure Actuator Loop 450, which is controlled by the first stage control strategy depicted in FIG. 6. FIG. 6 shows a block diagram of the algorithmic control strategy for determining a pressure command ($P_{cmd}$) 470, which serves as the target pressure of the Pressure Actuator Loop 450 for the first stage 20 of CFV 10.

Although the first stage strategy algorithm and second stage strategy algorithm should be reasonably understandable to those of skill in the art from a thoughtful review of the drawings in light of other aspects of this description, some further elaboration may be helpful. Generally, for the depiction of preferred algorithms in both FIG. 6 and FIG. 8, recurring common designations are used. Some of those designations are full words with common meanings, such as: "air" refers to air; "ratio" refers to a ratio between two data values. Although "CAN" is technically an acronym for controller-area-network, the "CAN" reference is a commonly used technical word that refers to a CAN network or, more accurately in the context of FIGS. 6 and 8, to data received via a CAN network.

On that note, it should be recognized that although a CAN network is the preferred communication link for communication of all commands, variables and other data received through line 101 by CFV controller 320 from outside of CFV assembly 10, wireless, analog signals, digital signals, or other communication means may be used as alternatives while still embracing many aspects of the present invention.

Common or readily understood abbreviations are also used in the drawings. Particularly for FIGS. 6 and 8, except to the extent that particular references may be further clarified otherwise: "mdot" refers to mass flowrate; "Cmd" denotes a command; "nrm" refers to a normalized value for a particular variable, which is a percent of the full scale for that variable; "FS" refers to full-scale or a scalar factor by which a normalized value is multiplied to obtain an actual value for the corresponding variable; "Pos" refers to position, such as the position of a valve or its actuator; "Tgt" refers to target, as in the target value for the effective area of a valve, denoted as "AEffTgt"; "1p" refers to a low-pass filter, or a variable that has been filtered by a low-pass filter; "ck" refers to theoretical choked flow equations; "SQRT" generally denotes a mathematical square root function, which will be described more fully elsewhere in the context of theoretical choked flow equations; "Aeff" is the effective orifice area of a particular valve; "TAEff" refers to a table look-up value for AEff for particular conditions; "max" refers to the maximum for a variable; "T" refers to temperature (except in the context of TAEff); "P" refers to pressure; and "dis" is short for "distant," reflective of the fact that the $P_3$ signal 520 in the preferred embodiment represents a downstream pressure measurement from the intake of engine 270.

More particularly, "SQRT_ck_T air" 570 is calculated based on the "gamma" specific heat ratio fuel constant (often denoted as "k") in relation to the temperature sensed by the temperature sensor 340 (numbered in FIG. 7). For our present purposes, the control strategy assumes that mdot will essentially follow the classic theoretical equation that:

$$\text{mdot} = A_{eff} * P * (\text{SQRT\_ck\_T}),$$

In this expression, "SQRT_ck_T" 480 is the square root of:

$$\{M/RT * \text{gamma} * \{[2/(\text{gamma}+1)]^{[(\text{gamma}+1)/(\text{gamma}-1)]}\}\}.$$

Here and in several other expressions 490, 492, 493, and 494, "$A_{eff}$" (or "AEff") is the effective area of the particular valve 20 or 30. Naturally, the effective area ($A_{eff}$) of a particular valve 20, 30, corresponds to the position of the respective valve 20, 30 and/or its actuator, which in turn depends largely on a command signal sent to the actuator for the corresponding valve 20, 30.

Central to the control strategy of FIG. 6 is the "Max" 590 decision, which allows the greater of two target pressure values 575, 550 to be the target for the actual Pressure Actuator Control Loop 450. The first target pressure value ("$P_{cmd}Tgt_1$") 550 is determined based on assumptions and relationships characterized in the first of two main calculations 505, 510 (the first calculation 505 being shown on the right in FIG. 6). In keeping with the classic theoretical equation for mass flow rates, $P_{cmd}Tgt_1$ 550 is calculated at division operation 559 by dividing mdotCmd 1p 558 by AEffTgt (SQRT_ck T) 494. Likewise, the second target pressure value ("$P_{cmd}Tgt_2$") 575 is determined based on assumptions and relationships characterized in the second of the two main calculations 505, 510 (the second calculation 510 being shown on the lower left quadrant of FIG. 6). When the first calculation 505 controls, it produces a $P_{cmd}$ 470 based on the assumption that choked flow will be easily achieved with a nominal position for valve 125 in the second stage 30; whereas the second calculation 510 of the two calculations 505, 510 (the second being on the left in FIG. 6) increases the $P_{cmd}$ 470 if available data suggests that choked flow will be less likely without greater pressure $P_2$ in the interstage chamber 300.

To intercept a situation where the predetermined adequate interstage pressure $P_2$ will not likely be maintained for achieving choked flow in the second stage 30, the second 510 of the two calculations 505, 510 (the second calculation 510 being on the left in FIG. 6) makes deductions from a downstream pressure signal, denoted as "$P_3$" or "$P_{dis}$" in expressions 520, 530 and 571. The $P_3$ data point represents the fuel pressure at the outlet 70 of CFV 10, which is approximated by $P_{dis}$ in the preferred embodiment as illustrated in the drawings. Preferably, the $P_{dis}$ data point is received via line 101 of the CAN network as data signal 520 from the ECM 100. The particular pressure signal considered ($P_{dis}$_nrm) 520 is an actual downstream pressure determination based on TMAP and/or TIP sensors 521 in engine 270. Based on data gathered from sensor 521 (or an alternative), ECM 100 makes an approximation of the pressure at CFV outlet 70. As reflected by the mdotCmdFS 555 (as with any other "FS" 555, 530 indications in FIGS. 6 and 8), the algorithm strategy then un-normalizes that mdotCmd_nrm 560 data by multiplying it by a full-scale (hence, "FS") value in order to attain an actual value for $P_{dis}$ 571. Again, that $P_{dis}$ 571 can then be used as a ballpark to approximate the likely fuel pressure delivered by the CFV 10 at the CFV outlet 70. Then, by comparing that pressure 571 to a predetermined $P_{ratio}$ 540 that is characteristic of the second stage valve 125, the first stage target pressure ($P_{cmd}$) 470 is increased proportionately (i.e., divided by $P_{ratio}$ 540) in order to ensure that the pressure in the intermediate chamber 300 pressure is high enough, generally.

With reference again to the first calculation 505 of the two calculations (the first calculation 505 being on the right side) in FIG. 6, the first calculation 505 determines the target $P_{cmd}Tgt_1$ 550 for the first stage 20 based on the assumption that choked flow will be easily achieved in the second stage 30 of CFV 10. Although the strategy of that first calculation should be understandable from the drawings, it may be helpful to understand that "$TA_{Eff}TgtNrm$" 565 refers to a table (hence, the "T-" prefix) look-up for the best nominal value of the effective area of the first stage CFV 20 to be targeted in order to achieve the particular mdot flowrate 105 required by the ECM 100. While various tables or algorithms may be used to determine "$TA_{Eff}TgtNrm$" 565, an empirically-determined table is used in the preferred embodiment, which is predetermined, preferably based on tests that are applicable to the valve characteristics of each particular first stage 20. For better clarity, one such table for a particular duplicate of CFV 10 is represented below, where the nominal target values for the Aefffgt_nrm (%) 565 (on the right in this table) are set based on the mdotCmd_nrm 560 (on the left in this table):

| mdotCmd_nrm (%) | AeffTgt_nrm (%) |
|---|---|
| 0.00 | 0.000 |
| 0.10 | 2.560 |
| 1.00 | 3.840 |
| 5.00 | 8.320 |
| 9.00 | 12.800 |
| 14.00 | 20.480 |
| 20.00 | 28.160 |
| 27.00 | 35.840 |
| 35.00 | 43.520 |
| 44.00 | 52.480 |
| 54.00 | 60.800 |
| 65.00 | 67.840 |
| 77.00 | 72.960 |
| 90.00 | 76.800 |
| 99.90 | 78.080 |
| 99.90 | 78.080 |

From the Aefffgt_nrm 565 determined according to such a table, that normalized table look-up 565 is then scaled appropriately for the particular fuel being used (by factoring in a ratio of the SQRT_ck_T variables for air 570 relative to the particular fuel 480, 580 in use) and for the maximum effective area 492 for the particular first stage 20 in use. The result of factoring in the SQRT_ck_T ratio and the maximum Aeff scales-up the appropriate target pressure level based on choked flow assumptions given the mdotCmd_nrm 560, which produces the $P_{cmd}Tgt_1$ 550 number reflected from the right side 505 of FIG. 6. Although buried in the math, it should be appreciated that the temperature $T_2$ sensed by thermistor 340 in the intermediate chamber 300 ("T") is used by the PCB 40 microprocessor 320 at various points in the control strategy, both for the first stage 20 and the second stage 30 control.

Accordingly, the optimal $P_{cmd}$ 470 level controls at the "Max" junction 590 in the strategy diagram of FIG. 6. Whichever is greater, in operation, PCB 40 sends the determined Max $P_{cmd}$ 470, 590 to the Pressure Actuator Loop 450 of the first stage 20 of the CFV 10 in order to achieve that pressure at the outlet 400 of first stage CFV 20 under the control of the Pressure Actuator Loop 450 of the first stage 20 of CFV 10. As should be understood, pressure actuator loop 450 is a conventional pressure feedback loop which adjusts the valve actuator 420 operation in a feedback control relationship to ensure that the Max $P_{cmd}$ 470, 590 is actually produced in the intermediate chamber 300, as is confirmed by the pressure sensor 331 of PCB 40, which is in direct fluid communication with a pressure sensing port 343 in that interstage chamber 300.

Second Stage Control Strategy

Further details of the second stage 30 of CFV 10 will be evident from the other illustrations and related descriptions provided herein, particularly with reference to FIGS. 7 and 8. Under control of the PCB 40—particularly, under control of the algorithms depicted as "Second Stage Control Strategy" (in FIG. 8) and the "2' Stage Actuator Loop" 190 in FIG. 1—the gaseous fuel from the second stage 30 of CFV 10 is provided at a controlled in flowrate to the CFV outlet 70, which is in fluid communication with the engine 270.

In second stage 30, PCB 40 controls the position of valve member 125 and its flow control surface 1100 based on $P_2$ and the known flow characteristics of second stage 30 in relation to its displacement, as depicted in FIG. 9. Under PCB 40 control, the actual $\bar{m}$ flowrate exiting CFV outlet 70 is managed following the two-stage control strategy of PCB 40, to match the current mdot demand 105 from ECM 100 consistently and continuously to within a 1% setpoint accuracy.

In a preferred embodiment, central valve member 125 is an elongate valve member with a central longitudinal axis 126. Central valve member 125 is positioned within second stage 30 concentric with both actuator 430 and with orifice 135 in a manner such that it is able to freely move toward and away from orifice 135 under the controlled influence of actuator 430. Central valve member 125 is characterized by a flow control surface 1100 at its end positioned in chamber 300, an actuating stem 115 opposing central valve member 125 at its end, and a mechanical stop structure 1200 therebetween. Central valve member 125 has an active flow control surface 1100 that has a "revolutional" shape. Surface 1100 is revolutional in that it generally has the shape of a surface of revolution. That surface of revolution is preferably an axial rotation of the shape profile visible in FIG. 10D, as rotated about the central longitudinal axis 126 of central valve member 125. Flow surface 1100 plays a role in regulating flow and pressure of gaseous fluid, as described further below.

FIG. 8 illustrates a block diagram of the control strategy 800 for determining a valve position command (V_PosCmd) 620 for sending to the Valve Actuator Loop 190 of the second stage 30 of CFV 10. Because the first stage strategy 600 is interdependent on the second stage in controlling the interstage pressure $P_2$, the second stage strategy 800 appears relatively simple. As shown in the block diagram, AeffCmd 803 is determined based on the mdotCmd_1p 558, which was determined based on the mdotCmd_nrm 560 of FIG. 6, after factoring in the full scale factor 555 to determine mdotCmd 556 and factoring in a low pass filter 557. Knowing the mdotCmd 1p 558, that command variable is then divided at division operation 802 by the P3*(SQRT_ck_T) 594 determination (calculated at multiplication operation 801) to resolve the necessary effective area AeffCmd 803 for second stage 30. From the necessary effective area AeffCmd 803, the valve position command for valve 125 is then determined from look-up table TAeffCmd 804. That table 804, in the preferred embodiment is the data equivalent of flow curve 900 depicted in FIG. 9. The resulting position command V_Pos_Cmd 620 is then sent to second stage actuator control loop 190 for effecting the corresponding instantaneous position of valve 125 relative to orifice 135. Preferred embodiments of the second stage of CFV 30 can achieve a nearly 18 g/s ṁ flowrate with a 16 mm stroke when operating with an interstage pressure $P_2$ of 200 kPa.

Operating Pressures

Although it will be understood that adaptations may be made for other upstream conditions, the pressure in the supply line 376 at the CFV inlet 390 is preferably controlled by mechanical pressure regulator 370 to be 60 psig (74.7 psi absolute) or greater, preferably in the range of 60 to 85 psig. In comparison, the maximum discharge pressure for CFV 10 is preferably controlled to be no more than 41.7 psi absolute, which will generally allow control of a critical pressure ratio of about 0.558 or less for CFV 10 while still enabling large dynamic power ranges.

Within the unitary block 90 of CFV 10, PCB 40 also monitors the interstage pressure $P_2$ and temperature $T_2$ in the interstage chamber 300 that bridges between the two stages 20 and 30. CFV 10 then functions to control the interstage pressure $P_2$ using electronic pressure feedback control to instantaneously achieve the $P_{cmd}$ determination following the strategy depicted in FIG. 6 which, given the first stage's preferred turndown ratio of 4:1, will typically be controlled to somewhere between 15 psig (¼ of 60) and 85 psig.

Preferred methods of controlling CFV 10 to achieve as much depend in part on actual or estimated fluid conditions of the fuel flow exiting outlet 70 of CFV 10. Although other ways of determining or estimating outlet fluid conditions are contemplated within the scope of certain variations of the invention, the illustrated embodiments determine as much from a downstream sensor 521 monitoring pressure (designated as "$P_3$" for our purposes) that is monitored by ECM 100 and for which a representative data signal 520 is continuously available from ECM 100 (or from the data network associated with ECM 100). The particular $P_3$ value of data signal 520 preferably represents any available data stream from engine 270 that is characteristic of pre-combustion fuel pressure within engine 270. As illustrated, the preferred downstream sensor 521 is a conventional TMAP sensor module located in the engine's air intake manifold 262 downstream from electronic throttle 240. In addition to, or as an alternative to, a conventional TMAP sensor 521, downstream data can also be gathered from a conventional TIP sensor module upstream of throttle 240. Still other alternative embodiments may also include a stand-alone pressure sensor (not shown) directly at the intake 272 of engine 270, and still other alternative embodiments instead rely on downstream data measured directly in the fuel supply line exiting CFV outlet 70, for reliable data on the actual pressure of the gaseous fuel discharged from CFV 10. Despite the benefits of knowing the downstream pressure $P_3$ for more preferred variations of the invention, it should be recognized that less preferred alternative embodiments of CFV 10 can function without knowing the value of downstream fuel pressures $P_3$, albeit requiring other adjustments and compromises.

Flow Control Variations Depending on Second Stage Valve Position

FIG. 9 is a graph illustrating a flow curve 900 of CFV 10. The primary curve 900 illustrates the intended flow curve for the second stage 30, when second stage 30 is adapted for use with a 300 horsepower variation of engine 270. For ease of illustration, although the pressure $P_2$ in interstage chamber 300 varies under control of in-block microcontroller 320 during normal operation, flow curve 900 shows the choked in flowrate relationship of the second stage depending on valve position, all for a single given pressure $P_2$ in chamber 300. That given pressure $P_2$ for curve 900 is 200 kPa.

The graph of flow curve 900 primarily illustrates the relationship between fuel in flowrates (grams per second) exiting CFV 10 based on the controlled position of second stage valve member 125, where that controlled second stage valve position is characterized by its longitudinal displacement (or "stroke," in millimeter units) from a fully closed position when valve 125 almost contacts concentric orifice 135, where the avoidance of such contact is ensured by mechanical stop assembly 1200. In comparison to the solid line depictions of an open position of valve 125 relative to orifice 135 in FIG. 10C, the fully closed position of valve 125 is also illustrated there in dashed line 135' (although it should be understood that the valve 125 is moved relative to orifice 135 in actual operation, rather than the orifice 135 being moved relative to the valve 135).

As represented by curve 900, the flow surface 1100 of second stage 30 has been shaped to vary the resulting in flowrate dependent on how far the second stage actuator 230 has moved the central member 125 away from a fully closed position relative to the second stage valve orifice 135, using a linear scale for both axes of the graph. As one of skill in the art will appreciate, the relationship depicted by curve 900 is largely the result of the shape of the outer flow surface 1100 (best illustrated in FIG. 10D) of central member 125, as will be described further herein.

For reference, FIG. 9 shows the full "stroke" range from 0.0 mm on the left to about 15½ mm on the right, as marked by the vertical dashed line 920. Three other dashed vertical stroke lines 921, 922 and 923 are also indicated of note intermediate the full range, with line 921 corresponding to half of the total stroke range (i.e., at approximately 7.7 mm) and line 922 corresponding to two-thirds of the total stroke range (i.e., at approximately 10.3 mm). The four dashed horizontal lines 930-933 correspond to flow rates of the points 910-913 that correspond to the four dashed vertical lines 920-923, respectively. While the maximum flowrate 930 is approximately 17.6 g/s in FIG. 9, the dashed horizontal line 933 corresponds to half that flowrate, or approximately 8.8 g/s.

Although characteristics of flow curve 900 may be drawn from additional observations about the shape of curve 900, several characteristics are presently thought to be especially notable for enabling the intended performance of CFV 10. For instance, curve 900 has relatively small slopes (i.e., the change in flowrate per change in stroke) in the lower fourth of the range of its stroke and, indeed, in the entire lower half of the range of its stroke, as compared to the slopes or average slope of the rest of its stroke range. Such relatively small slopes allow setpoint accuracies to be comparable in those lower ranges as compared to setpoint accuracies in higher stroke ranges.

It is also notable that flow curve 900 generally curves up (i.e., increases exponentially) in the lower half of the stroke range (left of line 921), and indeed generally curves up in the lower two-thirds of the stroke range (left of line 922). Accordingly, the greatest slopes for curve 900 (i.e., the greatest changes in flowrate per change in stroke) preferably occur in the upper half of the stroke range (i.e., the half where the central valve member is displaced further away from orifice 135). Such greatest slopes for curve 900 most preferably occur somewhere in the upper third of that stroke range or, as illustrated in FIG. 9, at about two-thirds of the total operative stroke range. The shape of flow curve 900 (and equivalent curves) allows setpoint accuracies to be comparable in both the upper and lower stroke ranges.

Lastly of note, as reflected by point 913 on curve 900, half the total in flowrate is not reached until the second stage actuator 430 moves flow valve 125 into the upper half of its stroke range, preferably even into the upper third of its stroke range, as indicated by point 913 being to the right of lines 921 and 922, respectively.

Each particular CFV 10 can be generally characterized by its maximum in flowrate, the operative stroke length of its second stage 30, and by the general shape of flow curve 900 as illustrated in FIG. 9. Despite such general characterizations, the precise flow curve 900 for each particular duplicate of CFV 10 will vary due to manufacturing tolerances and the like. Therefore, in order to ensure extremely accurate setpoint accuracies throughout the operating range of CFV 10, curve 900 (or equivalent data) for each duplicate of CFV 10 should be custom generated and stored in in-block controller 320. To produce a customized flow curve 900 for each duplicate of CFV 10, the CFV 10 is subjected to extra care during end-of-line calibration upon completion of manufacture, determining the effective area of second stage 30 for each of several characteristic valve positions across its operating range, preferably for at least fifteen valve positions for second stage 30. For even greater assurance of setpoint accuracy, a comparable level of extra care during calibration can also be undertaken for first stage 20.

It should also be understood by those of skill in the art that similarly-shaped curves to curve 900 (albeit with different flowrate ranges) would result when a particular model of CFV 10 is adapted for achieving higher max flowrates, as would commonly be appropriate for engines having greater horsepower. To produce similar curves for different power ranges and/or different applications, the second stage 30 is modeled for a particular interstage pressure that is likely to be sufficient for the range and/or application. For instance, to adapt for the 300 horsepower variation as is characteristic for flow curve 900, the second stage 30 is modeled for a sufficiently-high fixed interstage pressure value $P_2$, which is thought to have been predetermined somewhere in the 225 to 300 kPa range for curve 900. For less of a power range, the curve would look very similar to curve 900, although the maximum in flowrate would not need to be as high. Likewise, higher peak flowrates would be needed for more of a power range. For instance, to adapt for a 450 horsepower variation, the second stage 30 is modeled for a much higher fixed interstage pressure value $P_2$, and the maximum flowrate would likely need to reach to more than 25 grams/second.

Mechanical Stop Assembly 1200

The mechanical stop assembly 1200 of valve member 125 spans between the actuator stem 115 and its active flow control surface 1100. The mechanical stop assembly 1200 has two radially opposed stops 1200a and 1200b facing toward the distal end of valve member 125, and one annular stop facing toward the actuator shaft 115 in the opposite direction. Mechanical stops 1200a and 1200b limit axial movement of flow control surface 1100 into orifice 135, and annular stop 1200c limits axial movement of the flow control surface 1100 in the opposite direction, away from orifice 135.

As illustrated, mechanical stops 1200a and 1200b are preferably supported on outer distally-faced surfaces of winged protrusions that extend radially from opposite sides of central valve member 125. Winged protrusions of mechanical stops 1200a, 1200b are generally coplanar with the central axis of valve member 125 to more readily allow gaseous fluid to flow past the winged protrusions. A mechanical stop in the opposite direction is preferably provided on the actuator end of stop assembly 1200, by virtue of the smaller diameter of actuator stem 115, which is significantly narrower than the mechanical stop assembly 1200 as well as the revolutional flow control surface 1100.

Extremely Accurate Flowrate Setpoint Accuracies across Operating Ranges

The graph of FIG. 9 has also been modified to illustrate setpoint accuracy bands 901, 903 and 905 relative to the flow curve 900 of the graph. The setpoint accuracy bands 901, 903 and 905 illustrate the range of flowrates that would be within specification for full-range setpoint accuracies categorized as follows: +/−1%, i.e., extremely accurate, for setpoint accuracy band 901; +/−3%, i.e., highly accurate, for setpoint accuracy band 903; and +/−5%, i.e., generally accurate, for setpoint accuracy band 905. As is known, smaller percentages are characteristic of greater accuracy, and the greater the setpoint accuracy, the more closely the flowrate for each given set of conditions will match the intended in flowrate.

In preferred embodiments, control tolerances are experienced across the entire operating range. The bracketing solid lines 901a and 901b illustrate a 1% variation from the designed setpoint. Similarly, the intermediate dashed lines 903a and 903b illustrate a 3% variation from the designed setpoint. Finally, the outer solid lines 905a and 905b illustrate a 5% variation from the designed setpoint.

Due to the improvements embodied in dual-stage CFV 10 and its controller 320, preferred embodiments of the dual-stage CFV 10 are capable of achieving extremely-accurate, full-range in flowrates, achieving setpoint accuracies, more particularly, of about 1% (and, with extra careful quality control, less than 1%). Given the choked-flow aspects of the second stage 30, combined with other aspects of the preferred CFV 10, a 160:1 turndown ratio is readily achievable for the illustrated embodiment, while also enabling full-range setpoint accuracies to within less than 3%, and even about 1% with extra careful QC during manufacture of CFV 10. This means that such accuracies are achieved not only at the higher flowrates in the range, but also at the lowest ends of the flowrates in the operating range, which typically idles at about 0.25 grams/second, as well as throughout the rest of the operating range.

Large Dynamic Power Range & CFV Turndown Ratio

Preferred combinations are also able to achieve such setpoint accuracies for fuel flows ranging from 0.1 g/hour to 40 g/second. It should be recognized, however, that alternative embodiments do not necessarily attain such operating parameters. Ranges anywhere within that preferred range may be used in preferred alternative embodiments, although it is preferred to achieve turndown ratios of 60:1 or more, preferably in a dual-stage CFV 10 controlled by a common microprocessor 320 that manages interactive control strategies FIGS. 6 and 8 and/or chooses between different control strategies for different ranges of operating conditions.

The particular turndown ratio contribution for the second stage 30 is preferably 30:1 or greater, while a 50:1 turndown ratio is more preferably provided by the most preferred embodiment of second stage 30. As a result, achievable overall turndown ratios for alternative CFV embodiments of the present invention can reach as high as if not higher than 200:1 (4:1 for the $1^{st}$ stage compounded by 50:1 for the $2^{nd}$ stage), which is far more than needed for most large dynamic power range applications.

In the embodiment illustrated in the drawings, the first stage 20 has a turndown of ratio 4:1 and the second stage 30 has a turndown ratio of 40:1, resulting in a dynamic power range of 160:1. While other turndown ratios may be achieved within the scope of alternative embodiments, specific alternative embodiments achieve a 60:1 turndown ratio while retaining highly-accurate continuous-flow control (and, hence, power control) at both ends and throughout the range of operation—i.e., achieving actual flowrates that are less than a 1% deviation from targeted flowrates. Additionally, preferred embodiments of the CFV system do not have any orifices small enough to be susceptible to clogging, such that the CFV system is relatively unaffected by fuel contaminants.

While a setpoint accuracy within 1% variation from the intended flow curve 900 across the full operating range is desired and can be theoretically achieved through use of the preferred embodiments, Applicants have variations in manufacturing, pressure leaks, and accumulated wear of control members such as the central valve member 125 result in practical results an outer variability of the device that is consistently within the 3% setpoint accuracy band 903 across the entire flow curve 900. However, even with 3% variation, the ability to control the fuel flow to these tolerance bands across the entire flow curve would immediately be recognized by a person of reasonable skill in the art as novel in the field, especially at the lower end of the flow curve where the slope is much flatter, and it is desirous that a relatively large change in stroke distance results in a minimal change in flowrate.

Currently available gaseous flowrate controllers claim 1% setpoint accuracies, but they generally only achieve as much at the upper end of the operating range, where 1% accuracy is a much bigger and easier number to hit. Available CFV control systems are not able to maintain even 5% setpoint accuracies across their entire operating range when that range is considerable to any extent, much less for high dynamic power range applications.

In contrast, CFV 10 and many other embodiments are able to achieve highly accurate setpoint accuracies in most all vehicular applications. This capability is achieved in part to the second stage performance characteristics that produce a flow curve 900 of relatively small slope (i.e., closer to horizontal) in the lower half of its operating range as compared to the upper half of its operating range. More detailed aspects of such performance characteristics can be understood by those of skill in the art from a thoughtful review of the curve 900 shown in FIG. 9.

For instance, flow surface 1100 provides relatively tiny increases in flowrate per millimeter of actuator stroke for relatively-low flow settings, as indicated where the flow curve approaches horizontal, such as for stroke distances of between 0 and 4 mm. This tight control of flowrate, preferably within 3% of intended setpoint and more preferably within 1% of intended setpoint across the entire stroke range is achievable due in part to the geometry of the second stage flow valve. Here, the central valve member profile geometry is constantly tapering towards a point at the tip so that geometry is finely-tuned and constantly-variable across the entire stroke range. Additionally, at production, the geometry of central valve member 125 is calibrated in combination with its associated restricted orifice at every 0.5 mm so that actual values may be used to fine tune flowrates for each individual valve and central valve member assembly 125. Such fine tuning further aids in achieving the desired finely-tuned control across the entire flow curve range. Likewise, a major contributor to the maintenance of choked flow at these low-flow settings is the ability of the second stage 30 to achieve near instantaneous flowrate control.

Considering FIG. 9 in the context of the rest of these descriptions, it will be evident to one of skill in the art that choked flow can be achieved and maintained with CFV 10 at lower flowrates and within 3% to 5% set-point accuracy across the entire operating range in high dynamic power range applications.

Moreover, it should be recognized that the benefits suggested by second stage curve 900 are compounded by the benefits of the first stage control 20, as well as by the CFV's master logic determined by the in-block microcontroller 320 of PCB 40. While curve 900 is characteristic of a particular interstage pressure $P_2$, PCB 40 can enable a greater range of flowrates with comparable accuracy for the corresponding flowrate levels shown in FIG. 9 by varying that interstage pressure $P_2$ through operation of first stage 20. Presumably, given the preferred turndown ratio of 4:1 for first stage 20, that greater range of flowrates would be up to roughly four times the range shown in FIG. 9, while still achieving comparable setpoint accuracies across the greater range.

Second Stage Flow Control Surface

FIGS. 10A, 10B, 10C, and 10D illustrate 4 views of an embodiment of a central valve member 125, specifically, a side view, a top view, an end view, and a side view, respectively. Central valve member 125 is an elongate valve member having a revolutional flow control surface 1100 at one longitudinal end, a narrower actuator stem 115 at the its other longitudinal end, and a mechanical stop assembly 1200 therebetween. The actuator stem 115 is sized to fit slidably within actuator 430, and its longitudinal position is controlled (i.e., driven or moved longitudinally) by operation of that actuator 430. The space between stem 115 is manufactured to tight tolerances in order to minimize the risk of fuel leakage through actuator 430 while also minimizing the risk of binding the operative movement of stem 115. O-rings, bushings, collars or the like may also be used to optimize the interaction between stem 115 and actuator 430.

Central valve member's revolutional flow control surface 1100 is operatively positioned concentric with the second stage valve orifice 135, within the flow 351 of gaseous fuel from first stage 20, to define a radially uniform effective opening between central member 125 and the second stage valve orifice 135. The longitudinal position of that revolutional flow surface 1100, which is controlled by actuator 430 via stem 115, in turn controls the effective area of the radially uniform effective opening between that surface 1100 and orifice 135.

With reference to FIG. 10D, the shape of flow surface 1100 enables consistent flowrate setpoint accuracy across its range of operating positions. For reference, the shape as illustrated in FIG. 10D can be discussed relative to eight sequentially-adjacent sections 1210, 1220, 1230, 1201, 1240, 1250, 1260, 1270 of surface 1100, which are all concentric sections (about central axis 126) that collectively define particulars of the revolutional shape of flow control surface 1100. Although enlarged in FIG. 10D, surface 1100 has an overall length of about 25 to 30 mm from its proximal end of base 1210 to its distal end at downstream tip 1202, with radially-bulged section 1201 positioned only about 6 mm from the proximal end 1210 of surface 1100.

The widest dimension of the revolutional shape of surface 1100 is in the middle of the radially-bulged section 1201, which is preferably about 10 mm in diameter and is larger than the diameter of orifice 135. For another reference dimension, the transition section 1250 has a diameter of about 7½ mm, which is smaller than the diameter of orifice 135. The two axially-thinnest sections are the base section 1210 and the transition section 1250, both of which are constant diameter but which are only about a millimeter in axial dimension, giving each a shape comparable to a cylindrical disc. Both of these cylindrical disc sections 1210, 1250 have diameters between half and three-fourths of the diameter of radially bulged section 1201, although transitional section 1250 has a larger diameter than base section 1210.

The radially bulged section 1201 has a convex outer profile in FIG. 10D. The two sections 1260, 1270, combine to define most of the length of surface 1100, and both are generally conical while having a slightly convex outer profile in FIG. 10D. In contrast, two sections 1220 and 1240 have a concave outer profile in FIG. 10D, while section 1230 is substantially conical in shape.

Although other characteristics of that shape will be evident from a careful review of FIGS. 10A-10D, several aspects of that shape are notable. For example, the smooth radial bulge 1201 provides a redundant travel-stop in case of failure of the primary travel-stops 1200a and 1200b.

Revolutional flow surface 1100, in a preferred embodiment, can comprise a bell-shaped characteristic expressing functionality in the curvature extending from its proximal end at base 1210 to a bulge 1201 and ultimately to a protruding tip 1202. Specifically, the diameter of central valve member 125 can smoothly expand from its proximal end until it reaches a radial bulge 1201. From the bulge 1201 of central valve member 125, diameter of central valve member 125 can continually reduce, ultimately tapering to a point at the protruding tip 1202.

The gradual curvature running from the proximal end of surface 1100 to the bulge 1201 has a smooth increase in angle to accommodate the flow of gaseous fuel from central valve member 125 directionally flowing from left to right, as presented in the preferred embodiment of FIGS. 10A, 10B, 10C, and 10D. The flow of gaseous fluid along central valve member 125 from shaft 115 can result in large pressure spikes. As a result, the smoothly angled curvature with a continually expanding diameter of central valve member 125 allows enough expansion to accommodate the increased volume of gaseous fluid and continue flow.

From the bulge 1201 of the central valve member 125 the diameter continually reduces all the way to the tip 1202 of central valve member 125. At first, from the bulge 1201, the diameter reduces more sharply in angle initially, but results in more gradual reduction in diameter until it reaches the base of tip 1202. From the base of the tip 1202 to the end of the tip, once again, the diameter reduces more drastically until it tapers to a single point at the end.

The bulging outer shape of the flow surface 1100 of the central valve member 125 enables its performance characteristics. That bulging shape, which continuously varies along the entire length of flow surface 1100, a combination of a continually increasing diameter from the shaft 115 to the bulge 1201, followed by the continually reducing diameter from the bulge 1201 to the tip 1202, helps to manage the flow profile of gaseous fluid to maintain sufficiently laminar flow and to achieve desired setpoint accuracies across the entire range of operation for CFV 10. By controlling the effective orifice area while achieving choked flow, CFV 10 can be operated to achieve desirably accurate flow control. Hence, the amount of flow through the central valve member 125 corresponds with the effective area, as the central valve member 125 is concentric with orifice 135.

Note that, although orifice 135 is a square-faced orifice in the preferred embodiment, aspects of the present invention may be used in alternative embodiments with other types of valves or orifices. For instance, instead of the square-faced nature of orifice 135, with some trade-offs that may or may not fall outside the scope of the claimed invention, alternative embodiments may use venturi-like nozzles that smoothly converge toward a throat. Likewise, whereas the preferred embodiment of the fluid passage between orifice 135 and outlet 70 is shown with a somewhat conical divergence that allows for preferred diffusion of the flow downstream of orifice 135, many alternative shapes may be substituted for directing the discharge from second stage 30, assuming those alternative shapes and the resulting flow characteristics can be managed in a way that still enables some benefit from the invention.

Alternative Fuels

Gaseous fuel for these purposes means a fuel that is in the gaseous state at standard operating temperatures and pressures. In presently preferred embodiments, the gaseous fuel is natural gas, derived from either a liquefied natural gas (LNG) or compressed natural gas (CNG) storage state. While the most preferred embodiments are adapted for use with these fuels, adaptations will be evident to those of skill in the art for use of aspects of this invention with other fuels in alternative embodiments. Such alternative embodiments are adapted, for instance, for use with hydrogen or other gaseous fuels such as propane, butane or other gas mixtures, including those common with liquefied petroleum gas (LPG) mixtures. Indeed, although the present invention is focused on the particular fields to which the preferred embodiments apply, it may also well be that some aspects of the invention may be found revolutionary in other fields as well.

Alternatives in General

While the foregoing descriptions and drawings should enable one of ordinary skill to make and use what is presently considered to be the best mode of the invention, they should be regarded in an illustrative rather than a restrictive manner in all respects. Those of ordinary skill will understand and appreciate the existence of countless modifications, changes, variations, combinations, rearrangements, substitutions, alternatives, design choices, and equivalents ("Alternatives"), most if not all of which can be made without departing from the spirit and scope of the invention.

Therefore, the invention is not limited by the described embodiments and examples but, rather, encompasses all possible embodiments within the valid scope and spirit of the invention as claimed, as the claims may be amended, replaced or otherwise modified during the course of related prosecution. Any current, amended, or added claims should be interpreted to embrace all further modifications, changes, rearrangements, substitutions, alternatives, design choices, and embodiments that may be evident to those of skill in the art, whether now known or later discovered. In any case, all equivalents should be considered within the scope of the invention, to the extent expressly disclaimed during prosecution or to the extent necessary for preserving validity of particular claims in light of the prior art.

What is claimed is:

1. A flow valve assembly for achieving a desired flowrate for a gaseous fuel supply, comprising:
    a valve body including a fuel flow inlet, a fuel flow outlet, and an orifice coupling fuel flow inlet and outlet;
    a valve member including a shaft and a flow control surface positioned on a first end of the shaft and configured to engage the orifice to control the flowrate of the fuel supply;
    a linear motion actuator coupled with a second end of the shaft and configured to move the valve member axially relative to the orifice; and
    a controller configured to control the linear motion actuator to move the flow control surface to a position to provide for a desired flowrate of the fuel supply, wherein the desired flowrate is a supersonic value.

2. The flow valve assembly of claim 1, further comprising a position sensor configured to measure an axial position of the valve member relative to the orifice,
    wherein the controller is further configured to use measurements from the position sensor in controlling the linear motion actuator.

3. The flow valve assembly of claim 1, wherein the linear motion actuator is a voice coil actuator.

4. The flow valve assembly of claim 1, wherein the valve member further includes a mechanical stop configured to engage an entrance of the orifice to limit the flow control surface's engagement with the orifice.

5. The flow valve assembly of claim 4, wherein:
the flow control surface further includes a bulge having a largest cross-sectional diameter of the flow control surface; and
the bulge is configured to act as a redundant stop and engage the entrance of the orifice to limit the flow control surface's engagement with the orifice in the event of a failure of the mechanical stop.

6. The flow valve assembly of claim 1, further comprising a temperature sensor configured to take temperature readings of the fuel supply.

7. The flow valve of claim 1, further comprising a pressure sensor configured to take pressure readings of the fuel supply.

8. The flow valve assembly of claim 1, wherein the flow valve assembly is configured to produce a choked flow of the fuel supply.

9. The flow valve assembly of claim 1, wherein:
the flow valve assembly is configured to control a fuel supply to an internal combustion (IC) engine; and
the controller is further configured to:
communicate with an engine control module (ECM) of the IC engine,
receive a fuel flowrate command from the ECM, and
control the actuator to move the flow control surface to a position to provide for the fuel supply to be discharged from the flow valve assembly at a flowrate corresponding to the fuel flowrate command.

10. The flow valve assembly of claim 1, wherein the fuel flow inlet is coupled with a pressure regulator configured to regulate a pressure of the fuel supply upstream of the fuel flow inlet.

11. A method of controlling a fuel supply to an internal combustion (IC) engine, comprising:
controlling a flow rate of a fuel supply using a flow control assembly, the flow control assembly comprising:
a valve body including a fuel flow inlet, a fuel flow outlet, and an orifice coupling fuel flow inlet and outlet,
a valve member including a shaft and a flow control surface positioned on a first end of the shaft and configured to engage the orifice to control the flowrate of the fuel supply,
a linear motion actuator coupled with a second end of the shaft and configured to move the valve member axially relative to the orifice, and
a controller configured to control the linear motion actuator;
receiving, by the controller, a fuel flowrate command from a commanding controller, wherein the fuel flowrate command is a supersonic value; and
controlling, by the controller, the actuator to move the flow control surface to a position to provide for the fuel supply to be discharged from the flow valve assembly at a flowrate corresponding to the fuel flowrate command.

12. The method of claim 11, further comprising regulating a pressure of the fuel supply upstream of the flow control assembly using a pressure regulator.

13. The method of claim 11, wherein:
the flow control assembly further comprises a position sensor configured to measure an axial position of the valve member relative to the orifice; and
the controller is configured to use measurements from the position sensor in the controlling of the actuator.

14. The method of claim 11, wherein the linear motion actuator is a voice coil actuator.

15. The method of claim 11, wherein the valve member further includes a mechanical stop configured to engage an entrance of the orifice to limit the flow control surface's engagement with the orifice.

16. The method of claim 15, wherein:
the flow control surface further includes a bulge having a largest cross-sectional diameter of the flow control surface; and
the bulge is configured to act as a redundant stop and engage the entrance of the orifice to limit the flow control surface's engagement with the orifice in the event of a failure of the mechanical stop.

17. The method of claim 11, further comprising taking temperature readings of the fuel supply using a temperature sensor of the flow control assembly.

18. The method of claim 11, further comprising taking pressure sensor reading of the fuel supply using a pressure sensor of the flow control assembly.

19. The method of claim 11, wherein the flow control assembly is configured to produce a choked flow of the fuel supply.

20. The method of claim 11, wherein the commanding controller is an engine control module (ECM) of the IC engine.

* * * * *